(12) United States Patent
Hua et al.

(10) Patent No.: US 10,891,220 B2
(45) Date of Patent: *Jan. 12, 2021

(54) SYSTEMS AND METHODS FOR REVISING PERMANENT ROM-BASED PROGRAMMING

(71) Applicant: ABBOTT DIABETES CARE INC., Alameda, CA (US)

(72) Inventors: Xuandong Hua, Mountain View, CA (US); Kurt Leno, San Leandro, CA (US)

(73) Assignee: ABBOTT DIABETES CARE INC., Alameda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,703

(22) Filed: Aug. 9, 2018

(65) Prior Publication Data

US 2019/0129835 A1  May 2, 2019

Related U.S. Application Data

(63) Continuation of application No. 14/555,080, filed on Nov. 26, 2014, now Pat. No. 10,067,864.

(Continued)

(51) Int. Cl.
*G06F 12/02* (2006.01)
*G06F 12/06* (2006.01)

(52) U.S. Cl.
CPC ...... *G06F 12/0215* (2013.01); *G06F 12/0238* (2013.01); *G06F 12/0638* (2013.01); *G06F 2212/202* (2013.01); *Y02D 10/00* (2018.01)

(58) Field of Classification Search
CPC ............ G06F 12/0215; G06F 12/0238; G06F 2212/202; Y02D 10/13
See application file for complete search history.

(56) References Cited

U.S. PATENT DOCUMENTS 6,877,063 B1   4/2005  Allegrucci et al.
6,973,522 B1  12/2005  Takahashi
(Continued)

FOREIGN PATENT DOCUMENTS

CN       101840373 A       9/2010
GB         2 424 294        9/2006
WO    WO 00/78210 A1     12/2000

OTHER PUBLICATIONS

CN, 201480064824.3 First Office Action, dated Sep. 3, 2018.
(Continued)

*Primary Examiner* — Eric Cardwell
(74) *Attorney, Agent, or Firm* — One LLP

(57) ABSTRACT

An application program stored in a ROM includes a function lookup data structure in which functions called by the application program have identifiers and memory addresses at which the function is located and can be executed. Upon startup, the function lookup data structure is copied to a RAM as a revised lookup data structure and is compared to a revision lookup data structure also written to that RAM or elsewhere. If the revision lookup data structure contains replacement functions having the same function identifiers but new memory addresses, these new memory addresses are written over the existing addresses in the revised lookup data structure for those replacement functions. The application program refers to the revised lookup data structure to find and execute the functions; thus the original application program on the ROM can continue to be used with revised functions.

17 Claims, 11 Drawing Sheets

Related U.S. Application Data

(60) Provisional application No. 61/909,948, filed on Nov. 27, 2013.

(56) References Cited

U.S. PATENT DOCUMENTS

| | | |
|---|---|---|
| 7,080,245 B2 | 7/2006 | Ballard et al. |
| 7,809,347 B2 | 10/2010 | Yancey |
| 2006/0193375 A1 | 8/2006 | Lee |
| 2006/0242383 A1 | 10/2006 | Chen et al. |
| 2007/0083713 A1 | 4/2007 | Torrini et al. |
| 2008/0282022 A1 | 11/2008 | Gonikberg et al. |
| 2009/0327650 A1 | 12/2009 | Neuerburg |
| 2010/0045465 A1 | 2/2010 | Brauker et al. |
| 2010/0205422 A1 | 8/2010 | Shao et al. |
| 2010/0324392 A1 | 12/2010 | Yee et al. |
| 2011/0082484 A1 | 4/2011 | Saravia et al. |
| 2011/0106126 A1 | 5/2011 | Love et al. |
| 2011/0190603 A1 | 8/2011 | Stafford |
| 2011/0191044 A1 | 8/2011 | Stafford |
| 2011/0193704 A1 | 8/2011 | Harper et al. |
| 2011/0213225 A1 | 9/2011 | Bernstein et al. |
| 2011/0319729 A1 | 12/2011 | Donnay et al. |
| 2011/0320787 A1 | 12/2011 | Dieffenderfer et al. |
| 2012/0197222 A1 | 8/2012 | Donnay et al. |
| 2012/0284498 A1 | 11/2012 | Chou |
| 2013/0067186 A1 | 3/2013 | Pronovost et al. |

OTHER PUBLICATIONS

EP, 14866144.0 Extended Search, dated Jun. 15, 2017.
WO, PCT/US2014/067727 ISR and Written Opinion, dated Feb. 26, 2015.

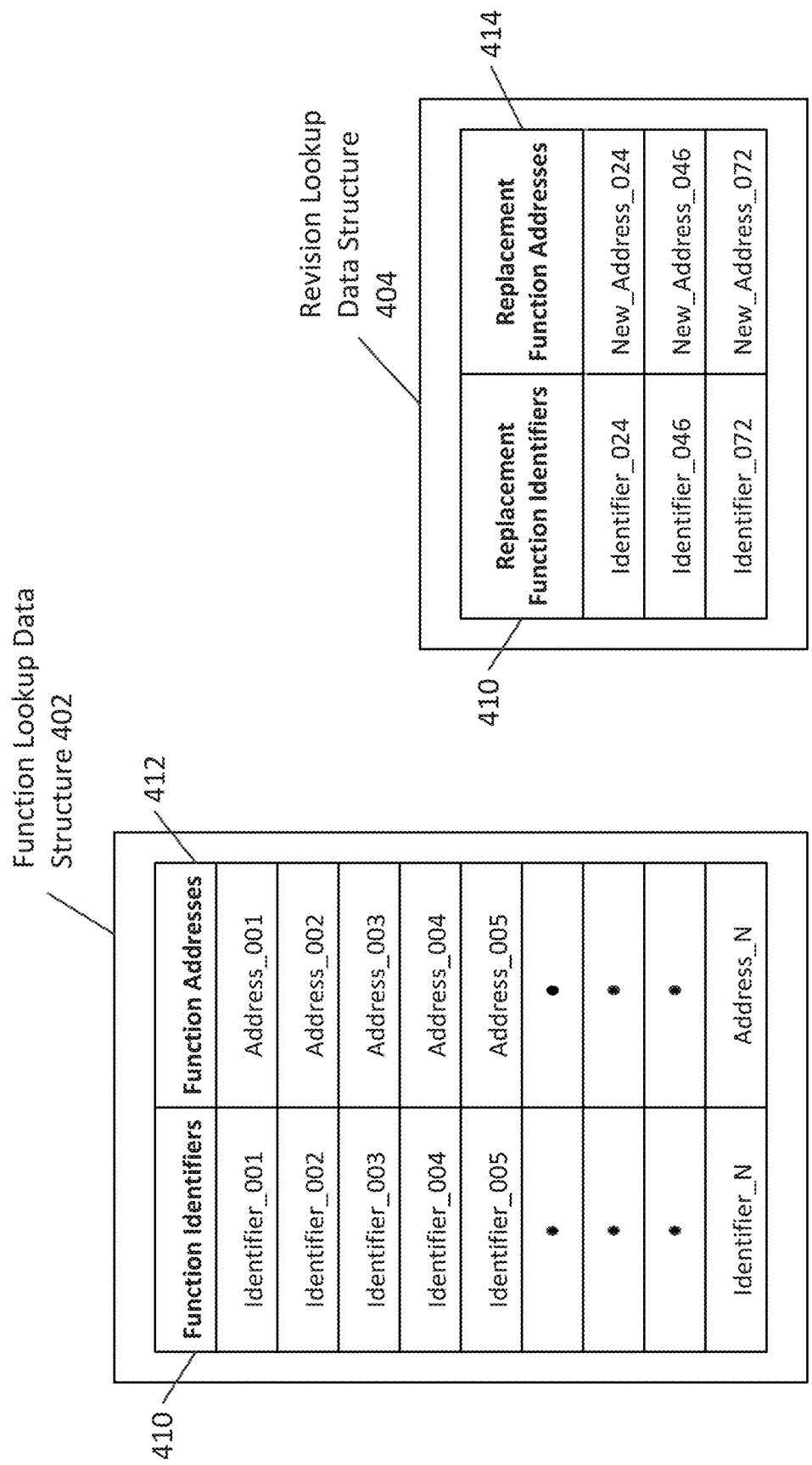

Revised Function Lookup Data Structure 406

| Function Identifiers | Function Addresses |
|---|---|
| Identifier_001 | Address_001 |
| Identifier_002 | Address_002 |
| Identifier_003 | Address_003 |
| • | • |
| • | • |
| Identifier_023 | Address_023 |
| Identifier_024 | New_Address_024 |
| • | • |
| • | • |
| Identifier_045 | Address_045 |
| Identifier_046 | New_Address_046 |
| • | • |
| • | • |
| Identifier_072 | New_Address_072 |
| Identifier_073 | Address_073 |
| • | • |
| • | • |
| Identifier_N | Address_N |

410 (left), 416 (right)

FIG. 4C

SYSTEMS AND METHODS FOR REVISING PERMANENT ROM-BASED PROGRAMMING

CROSS-REFERENCE TO RELATED APPLICATIONS

This application is a continuation of U.S. patent application Ser. No. 14/555,080, filed Nov. 26, 2014, which claims priority to, and the benefit of, U.S. Provisional Patent Application 61/909,948, filed Nov. 27, 2013, the contents of both of which are hereby incorporated by reference herein in their entirety and for all purposes.

FIELD

Systems, devices, and methods are provided with the ability to update programs stored in a read-only-memory, and more particularly, to alter the programming of application-specific circuit devices including application-specific integrated circuits.

BACKGROUND

Many different types of products use application-specific integrated circuits ("ASIC") as the programmed device that runs the product. Examples include cell phones, digital voice recorders, emission systems in automobiles, audio processing devices, and image processing devices. The medical field also includes ASICs in medical devices for treating patients afflicted with disease. One particular application is in the diabetes treatment field. Glucose monitors and other handheld and portable devices for sensing and processing glucose data include ASICs. The use of an ASIC permits a smaller and lighter product and one that is much faster at reading and processing glucose data than other more conventional processors. Diabetic patients generally monitor their glucose levels relatively often to ensure that those levels are being maintained within a clinically safe range. The diabetic patient may also use this glucose information to determine if insulin should be provided or other steps taken to control the glucose level in his/her body. Today, newer glucose sensors and other medical equipment are able to produce much higher quantities of data from the biological parameter they are used to sense, and such higher quantities of data require faster processors to make efficient use of that data. The ASIC can provide that higher processing speed.

ASICs are non-standard integrated circuits that have been designed for a specific use or application. Generally, an ASIC design will be undertaken for a product that will have a large production run, and the ASIC may contain a very large part of the electronics needed for that product located on a single integrated circuit. The cost of an ASIC design is relatively high, and they therefore are typically designed only for high volume products. Despite the higher front-end cost, the use of ASICs can be very cost effective for many applications where volumes are high. It is possible to tailor the ASIC design to meet the exact requirement for the product and using an ASIC can mean that much of the overall design can be contained in one integrated circuit. Consequently, the number of additional components can be significantly reduced. As a result, they are widely used in high volume products like cell phones or other similar applications, often for consumer products where volumes are higher, or for business products that are widely used, in additional to medical products.

With sufficient volume, custom chips, in the form of ASICs, offer a very attractive proposition. ASICs may also be used sometimes because they enable circuits to be made that might not be technically viable using other technologies. They may offer speed and performance that would not be possible if discrete components were used.

Low cost electronic products that are sold to mass consumer markets often include ASICs. Conventional ASIC methodology relies on libraries of so-called, "standard cells." These libraries contain large numbers of pre-designed circuits (basic building blocks). When a new consumer product is designed to include one or more ASICs, a subset of the pre-designed cells is typically chosen from available libraries for inclusion in the operative circuit space of the to-be-manufactured, monolithic integrated circuit (IC) and for use in a predefined consumer application (e.g., cell phone, PDA, video/music recorder/player, etc.). After the subset of cells is selected, one or more copies of those chosen building blocks are frugally laid-out in the IC circuit space, adjacent appropriate other blocks, and they are interconnected to thereby construct more complex circuits within the IC. It is desirable to use a relatively minimal number of building blocks because IC circuit space is considered expensive. Examples of digital ASIC standard cells include multi-BIT adders, multipliers, multiplexers, decoders, and memory blocks (look-up tables). Examples of analog ASIC standard cells include amplifiers, comparators, analog-to-digital, and digital-to-analog converters. ASICs may include mixed signal designs (ICs having both analog and digital circuitry on the same substrate).

Standard cells are generally hardwired, pre-tested, and pre-designed for maximum compactness relative to the general purpose applications in which they are expected to be used. This form of optimization is not perfect though because specific ones of the general purpose applications may nonetheless call for different switching speeds, frequency ranges, voltages, currents, and fabrication technologies. So a standard cell is sometimes not the most optimally compact and efficient design for a specific application. However, it is generally adequate given the diminishing returns tradeoff for redesign and optimizing efforts. One advantage of using standard cell libraries is that there is little guess work or surprise in determining whether each standard cell will work for its intended purpose or whether it will use up far more circuit space than may generally be necessary for realizing a desired function. The cells have been pre-tested and tweaked for meeting that goal in the general sense.

When compared with alternative approaches such as using a field-programmable gate array (FPGA) or programmable logic or a programmable logic device (PLD), one outstanding advantage of using standard cells is that they tend to have much shorter signal propagating times for similar dimensions (e.g. transistor channel lengths) in fabrication technology. One outstanding disadvantage of using standard cells is that there is little room for flexibility and design change after specific ones of the hardwired cells have been chosen, judiciously inserted into the ASIC design, and connected together.

Unfortunately, consumer markets tend to be very fluid and changing. One day, the consuming masses want one kind of function in a product and the next day, perhaps simply due to whim, they change their minds and demand a very different kind of function. An analogous situation exists in the medical field with handheld instruments; however, often for another reason. In the medical field, as a disease and its effects become better understood, different ways of analyzing patient data are found to be more effective in diagnosing and treating patients. New algorithms may be developed for both analyzing data and presenting it to physicians or other health care professionals for their use in treating a patient. This can be a problem for those desiring to use an ASIC in their products. A warehouse full of what, on one day is a highly-demanded product (with an incorporated ASIC into that product), can become worthless overnight as new technology becomes available.

ASICs and other devices utilize locally-stored programming or "software" to perform a number of measurement, data collection, data analysis, and other application-related functions. This software can be stored, at least in part, in non-volatile memory within the device. One such non-volatile memory is read-only memory (ROM), which provides advantages in cost, power efficiency, speed, and reliability, among others. Software that is stored in ROM is electrically and physically designed into the memory layout during the semiconductor manufacturing process, i.e., the software is permanently coded in the ROM. The software therefore cannot be altered after the semiconductor device has been manufactured. The introduction of a software revision can only be accomplished by redesigning the semiconductor device, producing a revised layout, assembling new photolithography masks, and fabricating entirely new semiconductor chips, which is a lengthy and expensive process. It may also require those semiconductor devices that were already assembled to be discarded.

The introduction of revisions to ROM-based software code may not be a significant concern in industries where the software functions are relatively simple and software development occurs at a relatively slow and measured pace. However, analyte monitoring applications can be complex and continually evolving as ever more research and resources are devoted to improving the health and lifestyle of patients. They are also subject to governmental regulations that can be introduced, changed, or interpreted in ways that require modifications to the operation of the analyte monitoring devices.

By way of a more specific, but hypothetical, example consider a case where a circuit designer has elected to use a first kind of data-inputting standard cell in his ASIC for processing input data streams (RF wireless transmissions, as an example) according to a corresponding, first industry standard protocol, call it, decompression "algorithm A." Industry experts have voted this "algorithm A" as being the best. However, after the ASIC is put into mass production, market forces are such that the majority of customers change their minds and decide they want a product that instead uses a different and incompatible input processing protocol, decompression "algorithm B." A popular journalist may have indicated he likes B better and suddenly consumers are demanding products that use decompression algorithm B. In such a case, the mass-produced ASICs that the designer has in his warehouses become essentially un-saleable. They work, but the market has now shrunk. If the marketing manager had had the foresight to instruct the circuit designer to use a second data-inputting standard cell that processes input data streams according to the competing, decompression "algorithm B" in his ASIC design instead of using the "algorithm A" block, the product would still be viable. However, in this case, the hard-to-predict changes in future market trends was in fact not predicted. As a result, his company is not able to sell more than a few of the algorithm A chips to what few customers are using algorithm A. Often, so-called network effects for interoperable devices are at work. Although algorithm A is a reasonable and perhaps a better choice, unpredictable market forces often come into play and allow an incompatible and alternate standard (algorithm B) to take an initial and commanding lead. This initial lead eventually translates into algorithm B becoming the dominant one in the given market space. The classic example is the BetaMax® versus the VHS® format battle that played out in the video-cassette recorders markets (VCR markets).

In order to deal with the unpredictable shifts in consumer demand, some designers have suggested shifting to the use of in-field fully-programmable logic or analog devices. Field programmable devices such as field-programmable logic devices (FPLD), field-programmable gate arrays (FPGA), complex programmable logic devices (CPLD), and others in the digital world are the antithesis of the full-ASIC approach. Essentially all of the circuitry in an FPLD is reprogrammable such that it can implement alternative functions. Thus, the incompatible programming problem can be obviated by allowing for programmable downloading of one or the other of the incompatible options. Manufacturers can theoretically load into their fully-programmable chips whichever of the competing protocols wins in the marketplace. The problem with the field-programmable approach however, is that the fully-programmable circuitry tends to be more expensive, larger in size, slower in response time, and prone to various problems from which ASIC circuitry does not generally suffer. One sample problem is that of having flawed software loaded into one or more of the many configuration memory cells (or fuses or anti-fuses) of a field-programmable device. Then the fully programmable device fails to work properly just because of the flaw. However, an ASIC standard cell is basically not programmable (not programmable to the same generic extent as are the counterpart, fully-programmable gate arrays) and it is not prone to the wrongful configuration problem. Also, the ASIC design does not need to consume as much circuit space, electrical power, and/or signal routing resources as does a fully-programmable (or fully re-programmable) field device for supporting configuration memory and its programmability or re-programmability. Thus, the ASIC solution tends to be more reliable, more compact, and more energy efficient.

A movement also existed towards a mixed genre referred to as "hybrid" ASIC-FPGA. The idea is to have some circuitry implemented as ASIC standard cells and other operative circuitry implemented as fully-field-programmable gate arrays. The specific mix and nature of such hybrid approaches are not well defined and have not overcome the problems of reduced speed and reliability.

The limited configurability of ASIC designs continues to be the benefit of ASICs and the problem. They may be programmable via control registers, but they use fixed architectures. These fixed architectures do not allow for functional modules to be re-arranged or reconfigured by a user. ASICs such as field programmable gate arrays ("FPGAs") permit the user to reconfigure or reprogram functional modules, however, they are an extreme example which requires a great deal of specialized programming and a special, fine-grained ASIC architecture to implement. Another attempted solution to programming ASICs is the use of a cross-point switch, such as that described in U.S. Pat. No. 7,809,347 to Yancy. However, this design also has disadvantages.

Hence, those skilled in the art have recognized the need for ASIC devices, the programming of which can be altered in the future in the event that changes are required. A need as also been recognized for a more simple approach to reprogramming ASIC devices to preserve the architecture of the ASIC while at the same time, providing for a different output from its use. The following subject matter fulfills these needs and others.

SUMMARY

In analyte monitoring environments, systems have been developed for the automatic monitoring of the analyte(s), like glucose, in bodily fluid such as in the blood stream, in interstitial fluid ("ISF"), dermal fluid, or in other biological fluid. Some of these systems are configured so that at least a portion of a sensor control device is positioned below a skin surface of a user, e.g., in a blood vessel or in the subcutaneous tissue of a user, so that the monitoring is accomplished in vivo. As such, these systems can be referred to as "in vivo" monitoring systems. In vivo monitoring systems can be further classified as one of at least two different types. One type is referred to as a "Continuous Analyte Monitoring" or "Continuous Glucose Monitoring" system, which can broadcast data from a sensor control device to a reader device continuously without prompting. A different type is referred to as a "Flash Analyte Monitoring" or a "Flash Glucose Monitoring" (or simply "Flash") system and can transfer data from the sensor control device in response to a scan by a reader device, such as with an NFC or RFID protocol. These Flash Analyte Monitoring systems can also operate without the need for finger stick calibration.

In vivo analyte monitoring systems can be differentiated from "in vitro" systems that contact a biological sample outside of the body (or rather "ex vivo") and typically include a meter device that has a port for receiving an analyte test strip carrying bodily fluid of the user, which can be analyzed to determine the user's blood sugar level.

In vivo monitoring systems can include a sensor device that makes contact with the bodily fluid of the user and senses the analyte levels contained therein while positioned in vivo. The sensor device can be part of a larger assembly that resides on the body of the user and contains the electronics and power supply that enable and control the analyte sensing. This larger assembly can be referred to as a "sensor control" device or unit, an "on-body electronics" device or unit, an "on-body" device or unit, or a "sensor data communication" device or unit, to name a few.

In vivo monitoring systems can also include a device that receives sensed analyte data from the sensor control device and processes and/or displays that sensed analyte data, in any number of forms, to the user. This receiving device can be referred to as a "reader device" (or simply a "reader"), or "handheld electronics" (or a handheld), a "portable data processing" device or unit, a "data receiver," a "receiver" device or unit (or simply receiver), or a "remote" device or unit, to name a few. Other devices such as personal computers have also been utilized with or incorporated into in vivo and in vitro monitoring systems.

Both in vitro and in vivo systems can utilize locally stored software to perform a number of measurement, data collection, data analysis, and other application related functions. This software can be stored, at least in part, in non-volatile memory (e.g., ROM) within the device.

Numerous embodiments are described herein that can allow the providers of analyte monitoring devices (and other devices) to enable, disable, or revise existing software that is, e.g., hardcoded within the ROM of a semiconductor device, without requiring the fabrication of new devices altogether. Many of these example embodiments are described with respect to an analyte monitoring environment, but can also be applied in other environments without limitation (both within and outside of the healthcare industry). It should be noted that in all cases these embodiments are for example only and are not intended to further limit the scope of the subject matter claimed herein beyond the explicit language of the claims themselves.

In many of these embodiments, an analyte monitoring device includes a processor adapted to execute application software, a read-only memory (ROM) having a function lookup data structure and a first function stored thereon, and a non-transitory writable memory having a revision lookup data structure and a replacement function stored thereon. Embodiments of the processor can include, for example, a microprocessor, controller, or microcontroller. In some embodiments, the first function is an original function.

Many of the example embodiments of performing the methods themselves can include: (a) copying, with the processor, the function lookup data structure from the ROM to the writable memory, where the function lookup data structure comprises an identifier for the first function and a first address of where the first function is stored; (b) referencing, with the processor, a revision lookup data structure, where the revision lookup data structure can include the identifier for the first function and a second address of where a replacement function for the first function is stored; and (c) if the revision lookup data structure indicates the existence of the replacement function, then replacing, with the processor, the first address of the first function in the function lookup data structure with the second address of the replacement function.

In certain embodiments, the writable memory includes non-volatile and non-transitory writable memory on which the revision lookup data structure and the replacement function are stored, as well as volatile and non-transitory writable memory to which the function lookup data structure is copied from the ROM.

In some embodiments, steps (a)-(c) are performed during a startup routine executed upon activation of the analyte monitoring device, where the analyte monitoring device is a sensor control device adapted for use in an in vivo analyte monitoring system, the sensor control device including a patch (or other body coupling mechanism) for coupling the sensor control device to the skin of a user and a sensor adapted for insertion through the user's skin. The methods can include the following steps (d)-(f) performed after steps (a)-(c): (d) when a function is called by the application software, locating the called function in the function lookup data structure; (e) reading an address for the called function from the function lookup data structure; and (f) executing the called function. Also, steps (d)-(e) can be performed after the sensor has been inserted through the user's skin, but while it's still positioned in the user's body.

In certain embodiments, the revision lookup data structure includes a first plurality of identifiers and a first plurality of addresses, where each identifier within the first plurality of identifiers corresponds to a different one of the first plurality of addresses, and where each identifier of the first plurality of identifiers and each corresponding address of the first plurality of addresses are specific to a different function of a first plurality of functions. Also, the function lookup data structure can include a second plurality of identifiers and a second plurality of addresses, where each identifier within the second plurality of identifiers corresponds to a different one of the second plurality of addresses, where each identifier of the second plurality of identifiers and each corresponding address of the second plurality of addresses are specific to a different function of a second plurality of functions, and where each identifier of the first plurality of identifiers is the same as an identifier of the second plurality of identifiers. In some embodiments, the first plurality of functions are original functions, and the second plurality of functions are replacement functions. The methods can further include, for each of the first plurality of functions of the revision lookup data structure: reading the identifier of that function from the revision lookup data structure; reading the corresponding address of that function from the revision lookup data structure; locating the identifier of that function in the function lookup data structure; and replacing the address of that function in the function lookup data structure with the corresponding address of that function that was read from the revision lookup data structure.

In some embodiments, the revision lookup data structure does not indicate the existence of a replacement function, the identifier for the first function is an index value, and/or the function lookup data structure and/or the revision lookup data structure are each an array or a software table.

In other embodiments, there is provided a method of revising programming of an application-specific integrated circuit comprising storing in a non-transitory ROM a data processing application program that calls and executes a function, an original function lookup data structure, and a plurality or original functions, wherein the original function lookup data structure includes an identifier for each of the original functions and a memory address at which each of the original functions is located, storing in a non-transitory writable memory a revision lookup data structure that includes identifiers and memory addresses for any replacement functions for the original functions, wherein the identifiers for replacement functions are identical to the identifiers for original functions which they are respectively replacing and wherein replacement functions will have different memory address from the memory addresses of the original functions they are replacing, copying the original function lookup data structure from the ROM to the writable memory as a revised function lookup data structure, comparing the revision lookup data structure to the revised function lookup data structure to determine if the revision lookup data structure includes any changes to the original function lookup data structure that was copied to the writable memory as the revised function lookup data structure, if the revision lookup data structure includes any changes to the original function lookup data structure copied to the writable memory as the revised lookup data structure, incorporating that change into the revised function lookup data structure and accessing the ROM to load and run the data processing application program using the revised function lookup data structure to locate and run functions when such are called by the data processing application program, and if the revision lookup data structure does not include any changes to the original function data structure copied to the writable memory as the revised lookup data structure, accessing the ROM to load and execute the data processing application program using the revised function lookup data structure as it was copied from the original function lookup data structure on the ROM to locate and execute functions when such are called by the data processing application program.

These embodiments can include the step of storing the address for a replacement function identified in the revision lookup data structure comprising storing the address in the writable memory. The step of storing the original function lookup data structure includes storing an identifier for each function that the application program calls and respective memory addresses for each of those identified functions at which the processor may locate the function and execute it.

The step of incorporating changes into the revised function lookup data structure comprises replacing the addresses in the revised function lookup data structure for replacement functions with the respective addresses in the revision lookup data structure.

Certain embodiments can also include the steps of the processor copying the original function lookup data structure to the writable memory as the revised function lookup data structure, comparing the revision lookup data structure to the revised function lookup data structure, and replacing addresses are all performed during a startup routine executed upon activation of the integrated circuit.

Also provided herein are numerous example embodiments of methods of producing an analyte monitoring device, where the analyte monitoring device can include a processor adapted to execute application software, a non-transitory and non-volatile writable memory, and a read-only memory (ROM) having a function lookup data structure and a first function stored thereon, where the function lookup data structure comprises an identifier for the first function and a first address of where the first function is stored. Examples of these methods can include: inputting a replacement function for the first function into the writable memory; and inputting a revision lookup data structure into the writable memory, where the revision lookup data structure includes an identifier for the first function and a second address of where the replacement function for the first function is stored.

In some embodiments, the writable memory has a memory input/output (I/O) bus that provides read and write access to the memory, and the memory I/O bus is not directly externally accessible.

In certain embodiments, the analyte monitoring device includes a serial interface, where the replacement function and the revision lookup data structure are input into the writable memory through the serial interface. In some of those embodiments, the analyte monitoring device can include a boundary scan architecture, and the serial interface can provide access to the boundary scan architecture.

In certain other embodiments, the analyte monitoring device includes a radio frequency (RF) receiver, where the replacement function and the revision lookup data structure are input into the writable memory using the RF receiver.

Also provided herein are numerous example embodiments of an analyte monitoring device. In many of these embodiments, the analyte monitoring device can include a processor adapted to execute application software and a non-transitory computer readable medium that can include both a non-transitory ROM, having a function lookup data structure and a first function stored thereon, and a non-transitory writable memory, having a revision lookup data structure and a replacement function stored thereon.

Further, the non-transitory computer readable medium can include a program that causes the processor to perform various methods. In certain embodiments, these methods can include: (a) copying the function lookup data structure from the ROM to the writable memory, where the function lookup data structure includes an identifier for the first function and a first address of where the first function is stored; (b) referencing a revision lookup data structure, where the revision lookup data structure can include the identifier for the first function and a second address of where a replacement function for the first function is stored; and (c) if the revision lookup data structure indicates the existence of the replacement function, then replacing the first address of the first function in the function lookup data structure with the second address of the replacement function.

As described earlier, in certain embodiments, the writable memory includes non-volatile and non-transitory writable memory on which the revision lookup data structure and the replacement function are stored, as well as volatile and non-transitory writable memory to which the function lookup data structure is copied from the ROM.

In some embodiments, steps (a)-(c) are performed during a startup routine executed upon activation of the analyte monitoring device, where the analyte monitoring device is a sensor control device adapted for use in an in vivo analyte monitoring system, the sensor control device including a patch for coupling the sensor control device to the skin of a user and a sensor adapted for insertion through the user's skin. The devices can be programmed to execute the following steps (d)-(f) after steps (a)-(c): (d) when a function is called by the application software, locating the called function in the function lookup data structure; (e) reading an address for the called function from the function lookup data structure; and (f) executing the called function. Also, steps (d)-(e) can be performed after the sensor has been inserted through the user's skin.

In certain embodiments, the revision lookup data structure includes a first plurality of identifiers and a first plurality of addresses, where each identifier within the first plurality of identifiers corresponds to a different one of the first plurality of addresses, and where each identifier of the first plurality of identifiers and each corresponding address of the first plurality of addresses are specific to a different function of a first plurality of functions. Also, the function lookup data structure can include a second plurality of identifiers and a second plurality of addresses, where each identifier within the second plurality of identifiers corresponds to a different one of the second plurality of addresses, where each identifier of the second plurality of identifiers and each corresponding address of the second plurality of addresses are specific to a different function of a second plurality of functions, and where each identifier of the first plurality of identifiers is the same as an identifier of the second plurality of identifiers. In these embodiments, the methods can further include, for each of the first plurality of functions of the revision lookup data structure: reading the identifier of that function from the revision lookup data structure; reading the corresponding address of that function from the revision lookup data structure; locating the identifier of that function in the function lookup data structure; and replacing the address of that function in the function lookup data structure with the corresponding address of that function that was read from the revision lookup data structure.

In some embodiments, the revision lookup data structure does not indicate the existence of a replacement function. In other embodiments, the identifier for the first function is an index value and either or both of the function lookup data structure and the revision lookup data structure are an array or a software table.

In another example embodiment, an integrated circuit is controlled by an application program to process signals, the integrated circuit comprising a processor, a non-transitory ROM in which is stored a data processing application program that calls and executes functions, an original function lookup data structure, and a plurality or original functions, wherein the original function lookup data structure includes an identifier for each of the original functions and a memory address at which each of the original functions is located, and a non-transitory writable memory in which is stored a revision lookup data structure that includes identifiers and memory addresses for any replacement functions for the original functions, wherein the identifiers for replacement functions are identical to the identifiers for original functions which they are respectively replacing and wherein replacement functions will have different memory addresses from the memory addresses of the original functions they are replacing, wherein the processor is programmed to copy the original function lookup data structure from the ROM to the writable memory as a revised function lookup data structure, compare the revision lookup data structure to the revised function lookup data structure to determine if the revision lookup data structure includes any changes to the original function lookup data structure that was copied to the writable memory as the revised function lookup data structure, if the revision lookup data structure includes any changes to the original function lookup data structure copied to the writable memory as the revised lookup data structure, incorporate such changes into the revised function lookup data structure and access the ROM to load and run the data processing application program using the revised function lookup data structure to locate and execute functions when such are called by the data processing application program, and if the revision lookup data structure does not include any changes to the original function data structure copied to the writable memory as the revised lookup data structure, access the ROM to load and run the data processing application program using the revised function lookup data structure as it was copied from the original function lookup data structure on the ROM to locate and execute functions when such are called by the data processing application program.

Other further detailed aspects include the address for a replacement function identified in the revision lookup data structure is located in the writable memory. The original function lookup data structure includes an identifier for each function that the application program calls and respective memory addresses for each of those identified functions at which the processor may locate the function and execute it. The function identifiers in the revision lookup data structure are identical to the function identifiers in the original function lookup data structure while the memory addresses in the revision lookup data structure are different from those in the original function lookup data structure, and wherein the processor replaces the addresses in the revised function lookup data structure for replacement functions with the respective addresses in the revision lookup data structure. The processor copying the original function lookup data structure to the writable memory as the revised function lookup data structure, comparing the revision lookup data structure to the revised function lookup data structure, and replacing addresses are all performed during a startup routine executed upon activation of the integrated circuit.

Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE DRAWINGS

The details of embodiments set forth herein, both as to structure and operation, are provided in the accompanying figures, in which like reference numerals refer to like or corresponding elements among the various views. The elements in the figures are not necessarily to scale, emphasis instead being placed upon illustrating the principles of the embodiments. Moreover, all illustrations are intended to convey concepts, where relative sizes, shapes and other detailed attributes may be illustrated schematically rather than literally or precisely.

FIG. 4A is a block diagram depicting a function lookup data structure in human readable form showing a list of function identifiers with respective function addresses at which the functions can be found for use.

FIG. 4B is a block diagram depicting a revision lookup data structure in human readable form in which certain function identifiers have been listed with new addresses at which the function can be found for use.

FIG. 4C is a block diagram depicting a revised function lookup data structure in human readable form after revision according to the revision lookup data structure of FIG. 4B.

DETAILED DESCRIPTION

It should be understood that the systems, devices, and methods described herein are not limited to the particular embodiments described below. Although referring to the medical field frequently, and in particular to the analyte monitoring and diabetes treatment fields, this is for the sole purpose of providing at least one embodiment. Other uses in other products, devices, systems, and methods are possible and the present subject matter is not to be limited to a medical field except as may be provided in the appended claims.

Figure 1:
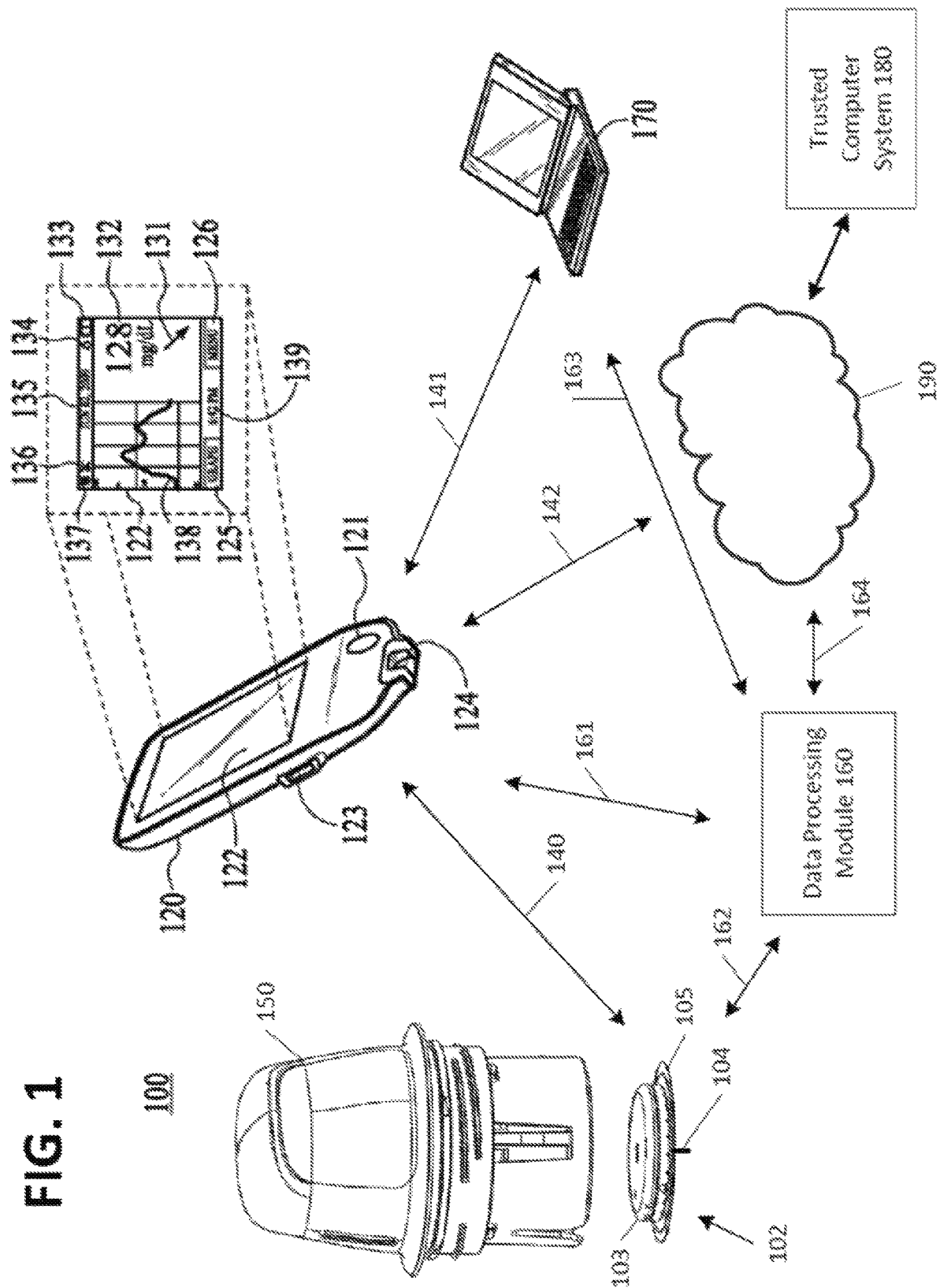
FIG. 1 is a high level diagram depicting an example of a system in which one component includes an ASIC that which receives data, processes that data, and outputs that data for use by the overall system, in this case an analyte monitoring system for real time analyte (e.g., glucose) measurement, data acquisition and/or processing.

FIG. 1 is an illustrative view depicting an example embodiment of an in vivo-based analyte monitoring system 100 having a sensor control device 102 and a reader device 120 that communicate with each other over a local communication path (or link) 140, which can be wired or wireless, and uni-directional or bi-directional. In embodiments where the path 140 is wireless, a near field communication (NFC) protocol, RFID protocol, Bluetooth® or Bluetooth® Low Energy protocol, wireless local area network ("WLAN") such as a Wi-Fi® network, proprietary protocol, or other protocols may be used (as will be discussed herein).

The reader device 120 is also capable of wired, wireless, or combined communication with a remote computer system 170 or server or servers over a communication path (or link) 141 and with other devices (e.g., a trusted computer system 180) by way of a network, such as a communications network 190, over a communication path (or link) 142. The communication paths 141 and 142 can be part of a telecommunications network, such as a WLAN network, a local area network (LAN), a wide area network (WAN), the Internet, or other data network for uni-directional or bi-directional communication. In an alternative embodiment, the communication paths 141 and 142 can be the same path. All communications over the paths 140, 141, and 142 can be encrypted and the sensor control device 102, the reader device 120, the remote computer system 170, and the trusted computer system 180 can each be configured to encrypt and decrypt those communications sent and received.

Figure 2A:
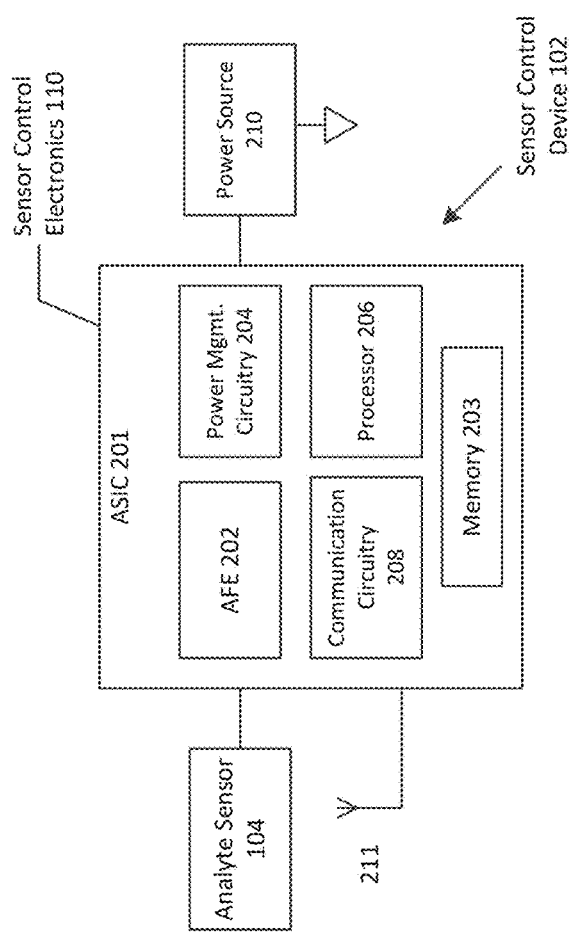
FIGS. 2A, 2B, and 2C are block diagrams depicting example embodiments of a sensor control device with FIG. 2A showing the entire sensor analog front end and the control electronics formed on a single ASIC, FIG. 2B showing an analog front end circuit formed on a first ASIC and the sensor control electronics formed on a second ASIC, and FIG. 2C showing a single ASIC in which a ROM having an application program, a RAM for writing and reading data and a FRAM also for writing and reading data are formed.
Figure 2B:
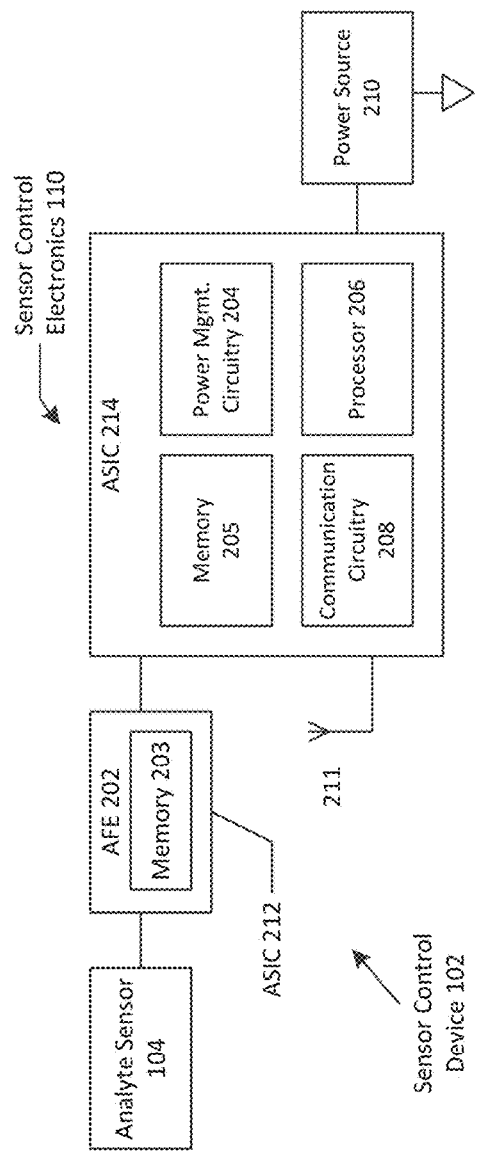
Figure 2C:
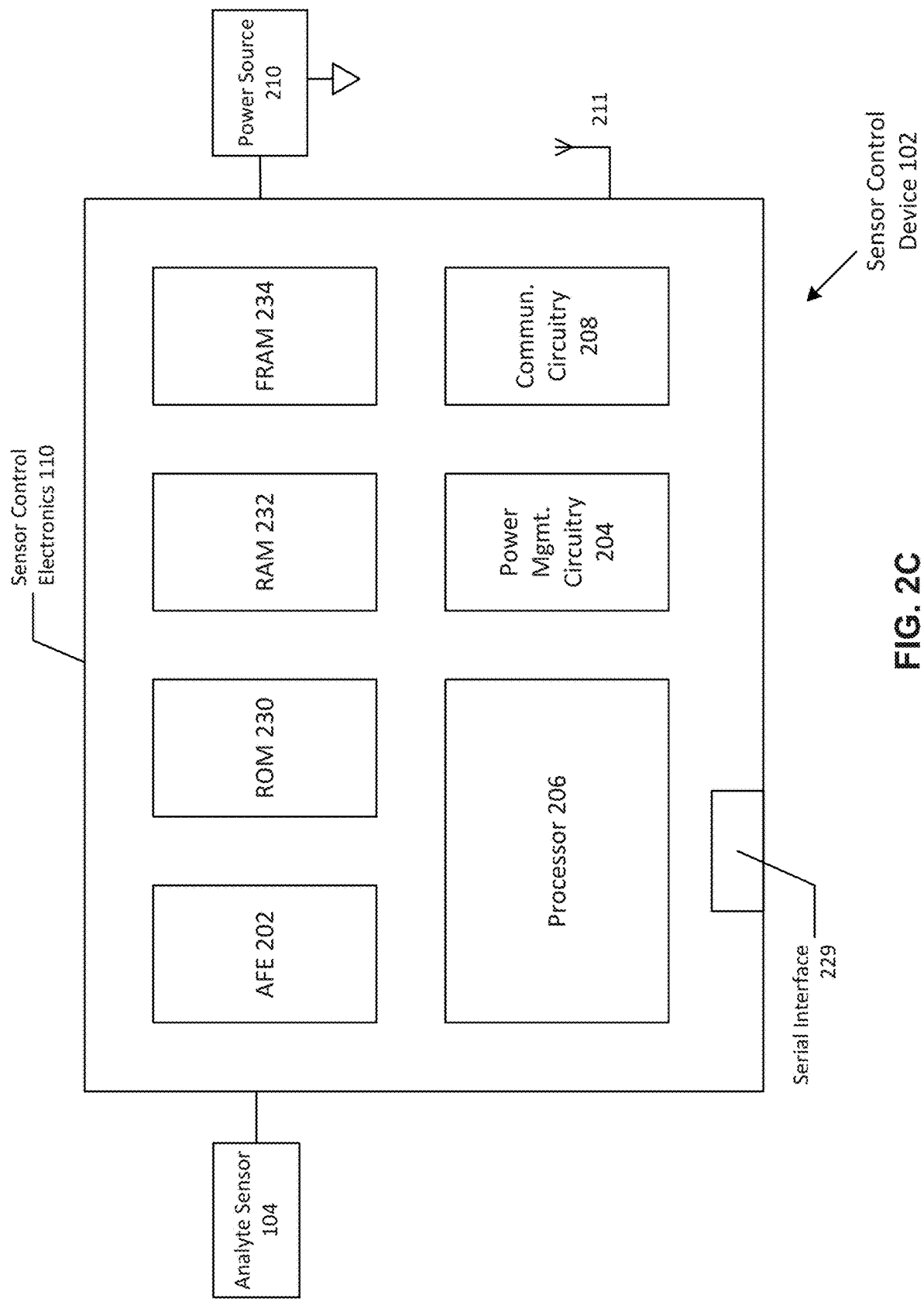

The sensor control device 102 can include a housing 103 containing an in vivo analyte monitoring circuitry and a power source (see, e.g., FIGS. 2A, 2B, and 2C). The in vivo analyte monitoring circuitry is electrically coupled with an analyte sensor 104 that extends through an adhesive patch 105 and projects away from the housing 103. The in vivo analyte monitoring circuitry can also control the sensor. It should be noted that in this and all embodiments described herein, the sensor control device 102 can be alternatively referred to as a "sensor."

An adhesive patch 105 contains an adhesive layer (not shown) for attachment to a skin surface of the body of the user. The sensor 104 is adapted to be inserted into the body of the user, where it can make contact with that user's body fluid (e.g., interstitial fluid (ISF) or blood) and be used, along with the in vivo analyte monitoring circuitry, to determine an analyte level of the user while at least a portion of the sensor is positioned in the user. That analyte level can be communicated (e.g., visually displayed) to the user, for example, on the reader device 120 and/or otherwise incorporated into a diabetes monitoring regime.

Also shown in FIG. 1 is an insertion device 150 that, when operated, transcutaneously positions a portion of the analyte sensor 104 through the user's skin and into contact with the bodily fluid, and positions the sensor control device 102 and the adhesive patch 105 onto the skin at a selected location. In certain embodiments, the sensor control device 102, the analyte sensor 104, and the adhesive patch 105 are sealed within the housing of the insertion device 150 before use, and in certain embodiments, the adhesive patch 105 itself provides a terminal seal of the insertion device 150. Other devices, systems, and methods that may be used with embodiments herein, including variations of sensor control device 102, are described, for example, in U.S. Publication Nos. 2010/0324392, 2011/0106126, 2011/0190603, 2011/

0191044, 2011/0082484, 2011/0319729, and 2012/0197222, the disclosures of each of which are incorporated herein by reference.

Referring back to FIG. 1, the analyte monitoring system 100 also includes the reader device 120, which includes a display 122 to visually output information to the user and/or to accept an input from the user (e.g., if configured as a touch screen), and an input component 121, such as a button, actuator, touch sensitive switch, capacitive switch, pressure sensitive switch, jog wheel, or other, to input data or commands to the reader device 120 or otherwise control the operation of the reader device 120. It is noted that some embodiments may include display-less devices or devices without any user interface components. These devices may be functionalized to store data as a data logger and/or provide a conduit to transfer data from a sensor control device and/or a display-less device to another device and/or location.

In certain embodiments, the sensor control device 102 may be configured to store some or all of the monitored analyte related data received from the analyte sensor 104 in a memory during the monitoring time period, and maintain it in the memory until the usage period ends. In such embodiments, the stored data is retrieved from the sensor control device 102 at the conclusion of the monitoring time period, for example, after removing the analyte sensor 104 from the user by detaching the sensor control device 102 from the skin surface where it was positioned during the monitoring time period. In such data-logging configurations, the real time monitored analyte level is not communicated to the reader device 120 during the monitoring period, but rather, retrieved from the sensor control device 102 after the monitoring time period.

In certain embodiments, the input component 121 of the reader device 120 may include a microphone and the reader device 120 may include software configured to analyze the audio input received from the microphone, such that functions and operation of the reader device 120 may be controlled by voice commands. In certain embodiments, an output component of the reader device 120 includes a speaker (not shown) for outputting information such as audible signals. Similar voice responsive components such as a speaker, microphone and software routines to generate, process and store voice driven signals may be provided to the sensor control device 102.

In certain embodiments, the display 122 and the input component 121 may be integrated into a single component, for example a display that can detect the presence and location of a physical contact touch upon the display such as a touch screen user interface. In such embodiments, the user may control the operation of the reader device 120 by utilizing a set of pre-programmed motion commands, including, but not limited to, single or double tapping the display, dragging a finger or instrument across the display, motioning multiple fingers or instruments toward one another, motioning multiple fingers or instruments away from one another, etc. In certain embodiments, a display includes a touch screen having areas of pixels with single or dual function capacitive elements that serve as LCD elements and touch sensors.

The reader device 120 also includes one or more data communication ports 123 for wired data communication with external devices such as a remote terminal, e.g., a personal computer. Example data communication ports include USB ports, mini USB ports, RS-232 ports, Ethernet ports, Firewire ports, or other data communication ports configured to connect to the compatible data cables. The reader device 120 may also include an integrated in vitro glucose meter, including an in vitro test strip port 124 to receive an in vitro glucose test strip for performing in vitro blood glucose measurements.

Referring still to FIG. 1, the display 122 can be configured to display a variety of information—some or all of which may be displayed at the same or different time on the display 122. The displayed information can be user-selectable so that a user can customize the information shown on a given display screen. The display 122 may include, but is not limited to, a graphical display 138, for example, providing a graphical output of glucose values over a monitored time period (which may show: markers such as meals, exercise, sleep, heart rate, blood pressure, etc.; numerical display 132, for example, providing monitored glucose values (acquired or received in response to the request for the information); and a trend or directional arrow display 131 that indicates a rate of analyte change and/or a rate of the rate of analyte change, e.g., by moving locations on display 122).

As further shown in FIG. 1, the display 122 may also include: date display 135, which can provide date information for the user; time of day information display 139 providing time of day information to the user; battery level indicator display 133 graphically showing the condition of the battery (rechargeable or disposable) of the reader device 120; the sensor calibration status icon display 134, for example, in monitoring systems that require periodic, routine or a predetermined number of user calibration events notifying the user that the analyte sensor calibration is necessary; audio/vibratory settings icon display 136 for displaying the status of the audio/vibratory output or alarm state; and wireless connectivity status icon display 137 that provides indication of wireless communication connection with other devices such as sensor control device 102, remote computer system 170, and/or trusted computer system 180. As additionally shown in FIG. 1, the display 122 may further include simulated touch screen buttons 125, 126 for accessing menus, changing display graph output configurations or otherwise for controlling the operation of reader device 120.

With continued reference to FIG. 1, in certain embodiments, the reader device 120 can be configured to output alarms, alert notifications, glucose values, etc., which may be visual, audible, tactile, or any combination thereof. In one aspect, the reader device 120 may include other output components such as a speaker, vibratory output component and the like to provide audible and/or vibratory output indications to the user in addition to the visual output indication provided on display 122. Further details and other display embodiments can be found in, e.g., U.S. Publication No. 2011/0193704, which is incorporated herein by reference.

Data can be sent from the sensor control device 102 to the reader device 120 at the initiative of either the sensor control device 102 or the reader device 120. For example, in some embodiments the sensor control device 102 can communicate data periodically in a broadcast-type fashion, such that an eligible reader device 120, if in range and in a listening state, can receive the communicated data (e.g., sensed analyte data). This is at the initiative of the sensor control device 102 because the reader device 120 does not send a request or other transmission that first prompts the sensor control device 102 to communicate in one embodiment. The broadcasts can occur according to a schedule that is known to both devices 102 and 120, or can occur in a random or pseudorandom fashion, such as whenever the sensor control device 102 detects a change in the sensed analyte data.

Further, broadcasts can occur in a repeated fashion regardless of whether each broadcast is actually received by a reader device 120.

In another embodiment, the reader device 120 sends a transmission that prompts the sensor control device 102 to communicate its data to the reader device 120. This is sometimes referred to as "on-demand" data transfer. An on-demand data transfer can be initiated based on a schedule stored in the memory of the reader device 120, or at the behest of the user via a user interface of the reader device 120. Data exchange can be accomplished using broadcasts only, on-demand transfers only, or any combination thereof.

For example, the reader device 120 may be configured to transmit one or more commands to the sensor control device 102 to initiate data transfer, and in response, the sensor control device 102 may be configured to wirelessly communicate stored analyte related data collected during the monitoring time period to the reader device 120.

The reader device 120 may in turn be connected to the remote terminal 170, such as a personal computer, which can be used by the user or a medical professional to display and/or analyze the collected analyte data. The reader device 120 may also be connected to a trusted computer system 180. In both instances, the reader device 120 can function as a data conduit to transfer the stored analyte level information from the sensor control device 102 to the remote terminal 170 or the trusted computer system 180. In certain embodiments, the received data from the sensor control device 102 may be stored (permanently or temporarily) in one or more memories of the reader device 120. The reader device 120 can also be configured as a data conduit to pass the data received from the sensor control device 102 to a remote terminal 170. In one embodiment, the reader device 120 may take the form of a programmed iPhone® mobile telephone made by the Apple, Inc.

The remote terminal 170 may be a personal computer, a server, a laptop computer, a tablet, or other suitable data processing device. The remote terminal 170 can be (or include) software for data management and analysis and communication with the components in analyte monitoring system 100. For example, the remote terminal 170 may be connected to a local area network ("LAN"), a wide area network ("WAN"), wireless local area network ("WLAN"), or other data network for unidirectional or bidirectional data communication between the remote terminal 170 and the reader device 120. In one embodiment, the remote terminal may be nearby the reader device 120 and may include one or more computer terminals located at a physician's office or a healthcare facility. In other embodiments, the remote terminal 170 may be located at a location other than nearby the reader device 120, and may be located quite far away. For example, the remote terminal 170 and the reader device 120 could be in different rooms or different buildings of the same facility. In other embodiments, they may be separated by much greater distances.

In certain embodiments, the analyte monitoring system 100 can also be configured to operate with a separate, optional data communication/processing device such as a data processing module 160 as described in U.S. Publication No. 2011/0213225, incorporated herein by reference. The data processing module 160 may include components to communicate using one or more wireless communication protocols such as, for example but not limited to, an infrared (IR) protocol, a Bluetooth® protocol, a Zigbee® protocol, and the 802.11 wireless LAN protocol. Additional descriptions of communication protocols including those based on the Bluetooth® protocol and/or the Zigbee® protocol can be found in U.S. Publication No. 2006/0193375, incorporated herein by reference. The data processing module 160 may further include communication ports, drivers, or connectors to establish wired communication with one or more of the reader device 120 (via communication link 161), the sensor control device 102 (via communication link 162), the remote terminal 170 (via communication link 163), or a communication network 190 including, for example but not limited to, a USB connector and/or USB port, an Ethernet connector and/or port, a FireWire connector and/or port, or an RS-232 port and/or connector.

In certain embodiments, the data processing module 160 is programmed to transmit a polling or query signal to the sensor control device 102 at a predetermined time interval (e.g., once every minute, once every five minutes, or other), and in response, receive the monitored analyte level information from the sensor control device 102. The data processing module 160 stores in its memory the received analyte level information, and/or relays or retransmits the received information to another device such as the reader device 120. More specifically in certain embodiments, the data processing module 160 may be configured as a data relay device to retransmit or pass through the received analyte level data from the sensor control device 102 to the reader device 120 or a remote terminal (for example, over a data network such as a cellular or WiFi® data network) or both.

In certain embodiments, the sensor control device 102 and the data processing module 160 may be positioned on the skin surface of the user within a predetermined distance of each other (for example, about 1 to 12 inches (2.5 to 30 cm) or less) such that periodic communication between the sensor control device 102 and data processing module 160 is maintained. Alternatively, the data processing module 160 may be worn on a belt or clothing item of the user, such that the desired distance for communication between the sensor control device 102 and data processing module 160 for data communication is maintained. The housing of the data processing module 160 may be configured to couple to or engage with the sensor control device 102 such that the two devices are combined or integrated as a single assembly and positioned on the skin surface. In further embodiments, the data processing module 160 is detachably engaged or connected to the sensor control device 102 providing additional modularity such that data processing module 160 may be optionally removed or reattached as desired.

Both the sensor control device 102 and the data processing module 160 are candidates for having an ASIC or multiple ASICs. They may be manufactured in large quantities because both may be prescribed for numerous patients.

Referring again to FIG. 1, in certain embodiments, the data processing module 160 is programmed to transmit a command or signal to the sensor control device 102 at a predetermined time interval, such as once every minute, or at any other suitable or desired programmable time interval to request analyte related data from the sensor control device 102. When the data processing module 160 receives the requested analyte related data, it stores the received data. In this manner, the analyte monitoring system 100 may be configured to receive the continuously monitored analyte related information at the programmed or programmable time interval, which is stored and/or displayed to the user. The stored data in the data processing module 160 may be subsequently provided or transmitted to the reader device 120, the remote terminal 170, or the like for subsequent data analysis such as identifying a frequency of periods of glycemic level excursions over the monitored time period, or the frequency of the alarm event occurrence during the monitored time period, for example, to improve therapy related decisions. Using this information, the doctor, healthcare provider, or the user may adjust or recommend modification to the diet, daily habits and routines such as exercise, and the like.

In another embodiment, the data processing module 160 transmits a command or signal to the sensor control device 102 to receive the analyte related data in response to a user activation of a switch provided on the data processing module 160 or a user initiated command received from the reader device 120. In further embodiments, the data processing module 160 is configured to transmit a command or signal to the sensor control device 102 in response to receiving a user initiated command only after a predetermined time interval has elapsed. For example, in certain embodiments, if the user does not initiate communication within a programmed time period, such as for example about five hours from last communication, the data processing module 160 may be programmed to automatically transmit a request command or signal to the sensor control device 102. Alternatively, the data processing module 160 may be programmed to activate an alarm to notify the user that a predetermined time period has elapsed since the last communication between the data processing module 160 and the sensor control device 102. In this manner, users or healthcare providers may program or configure the data processing module 160 to provide certain compliance with an analyte monitoring regimen, so that frequent determination of analyte levels is maintained or performed by the user.

The remote terminal 170 in certain embodiments may include one or more computer terminals located at a medical professional's office or a healthcare facility. For example, the remote terminal 170 may be located at a location other than the location of the reader device 120 although it may be nearby. Alternatively, the remote terminal may be located in a different room or rooms or different buildings, or even further apart from the reader device 120.

The trusted computer system 180 can be within the possession of the manufacturer or distributor of the sensor control device 102, either physically or virtually through a secured connection, and can be used to provide software updates to the sensor control device 102 and/or perform other functions with respect to the sensor control device 102. The trusted computer system 180 can be trusted simply by virtue of it being within the possession or control of the manufacturer, such in the case where it is a typical web server. Alternatively, the trusted computer system 180 can be implemented in a more secure fashion such as by requiring additional password, encryption, firewall, or other Internet access security enhancements that guard against counterfeiter attacks or other unauthorized access, such as by computer hackers.

The trusted computer system 180 can also be referred to as a registration computer system 180, or simply a computer system 180. The trust0e0d computer system 180 can include one or more computers, servers, networks, databases, and the like.

In certain embodiments, programmed or programmable alarm conditions may be detected for example, a detected glucose level monito1red by the analyte sensor 104 that is outside a predetermined acceptable range indicating a physiological condition which requires attention or intervention for medical treatment or analysis such as, for example, a hypoglycemic condition, a hyperglycemic condition, an impending hyperglycemic condition or an impending hypoglycemic condition. One or more output indications may be generated by the control logic or the processor of the sensor control device 102 and output to the user on a user interface of the sensor control device 102 so that corrective action may be timely taken. If the reader device 120 is within communication range, the output indications or alarm data may be communicated to the reader device 120 whose processor, upon detection of the alarm data, can control the display 122 to output one or more notifications.

In certain embodiments, the control logic or microprocessors of the sensor control device 102 include software programs to determine future or anticipated analyte levels based on information obtained from the analyte sensor 104, e.g., the current analyte level, the rate of change of the analyte level, the acceleration of the analyte level change, and/or analyte trend information, which can be determined based on a historical trend or direction of analyte level fluctuation as a function of time during a monitored time period. Predictive alarm parameters may be programmed or are programmable in the reader device 120, or the sensor control device 102, or both, and output to the user in advance of anticipating the user's analyte level reaching the future level. This provides the user an opportunity to take timely corrective action.

Processing of the data within the monitoring system 100 can be performed by one or more control logic units or processors of the reader device 120, the data processing module 160, the remote terminal 170, the trusted computer system 180, and/or the sensor control device 102. Such information may be displayed as, for example, a graph (such as a line graph) to indicate to the user the current, historical, and/or predicted future analyte levels as measured and predicted by the analyte monitoring system 100. Such information may also be displayed as directional arrows (for example, see the trend or directional arrow display 131) or other icon(s), e.g., the position of which on the screen is relative to a reference point to indicate whether the analyte level is increasing or decreasing as well as the acceleration or deceleration of the increase or decrease in the analyte level. This information may be utilized by the user to determine any necessary corrective actions to ensure the analyte level remains within an acceptable and/or clinically safe range.

Other visual indicators, including colors, flashing, fading, etc., as well as audio indicators, including a change in pitch, volume, or tone of an audio output, and/or vibratory or other tactile indicators may also be incorporated into the outputting of trend data as means of notifying the user of the current level, direction, and/or rate of change of the monitored analyte level. For example, based on a determined rate of glucose change, programmed clinically significant glucose threshold levels (e.g., hyperglycemic and/or hypoglycemic levels), and current analyte level derived by an in vivo analyte sensor, an algorithm stored on a computer readable medium of the system 100 can be used to determine the time it will take to reach a clinically significant level and can be used to output a notification in advance of reaching the clinically significant level, e.g., 30 minutes before a clinically significant level is anticipated, and/or 20 minutes, and/or 10 minutes, and/or 5 minutes, and/or 3 minutes, and/or 1 minute, and so on, with outputs increasing in intensity or the like.

The sensor control device 102 and data processing device 160 discussed above may very possibly include one or more ASICs. Both the sensor control device and the processing device can be small and light devices for attaching to a patient. The in vivo insertion device 102 is likely to be disposable after each use, and both may be manufactured in large quantities due to their use by many patients afflicted with the same disease. In both cases, algorithms residing in the devices for generating and/or processing biological data may change and software updates may be desirable for their ASICs.

FIGS. 2A, 2B, and 2C are block schematic diagrams depicting example embodiments of electrical circuits that receive signals at an input, process those signals with a processor, and output data signals, each of which has a processor that is controlled by an application program stored in a read-only-memory. More specifically, each circuit shown in these figures receives input signals from an analyte sensor 104 at an analog front end 202, processes those input signals with a processor 206, and outputs data signals at an antenna 211. The application program controlling the processor 206 is stored in a ROM 203, 205, and 230 respectively.

FIGS. 2A and 2B present a sensor control device 102 having an analyte sensor 104 and sensor control electronics 110 (including analyte monitoring circuitry) that can optionally have the majority of the processing capability for rendering end-result data suitable for display to the user. In FIG. 2A, a single semiconductor chip 201 is depicted that can be a custom application specific integrated circuit ("ASIC"). Shown within the ASIC 201 are certain high-level functional units, including an analog front end ("AFE") 202, power management (or control) circuitry 204, a processor 206, and communication circuitry 208 used to feed an antenna 211. In this embodiment, both the AFE 202 and the processor 206 are used as analyte monitoring circuitry, but in other embodiments either circuit can perform the analyte monitoring function. The processor 206 can be any type of hardware processor that is capable of executing a program provided as software or in other form, including a microprocessor, a processing unit, a processing core, a control unit, a controller, or a microcontroller, to name a few.

A memory 203 is also included within the ASIC 201 of FIG. 2A and can be shared by the various functional units present within the ASIC 201, or can be distributed amongst two or more of them. The memory 203 can also be a separate chip. This memory 203 can include volatile and non-volatile memory, and this and all other embodiments of memory (or storage) herein are non-transitory (i.e., not a propagating signal) in all forms. In this embodiment, the ASIC 201 is coupled with a power source 210, which can be a coin cell battery, or other source. The AFE 202 has an input that interfaces with the output of an in vivo analyte sensor 104 in this embodiment and receives measurement data therefrom. The AFE outputs the data to the processor 206 in digital form, which in turn processes the data to arrive at the end-result glucose discrete and trend values, etc. A processing application program is run in this embodiment to control the input, processing, and output of data by the ASIC. This application program is stored primarily in a read-only form on the ASIC.

The end-result or output data generated by the processor 206 can then be provided to the communication circuitry 208 of the ASIC for propagating by way of an antenna 211 (an output) in this embodiment, to a reader device 120 (shown in FIG. 1) where further processing may be performed as needed by the resident software application on the reader device to display the data, or otherwise use it.

FIG. 2B is similar to FIG. 2A but instead includes two discrete semiconductor chips 212 and 214, which can be packaged together or separately. Here, the AFE 202 is resident on the ASIC 212. The processor 206 is integrated with the power management circuitry 204 and the communication circuitry 208 on the chip 214. The AFE 202 includes a memory 203 and the chip 214 includes a memory 205, which can be isolated or distributed within. In one example embodiment, the AFE 202 is combined with the power management circuitry 204 and the processor 206 on one chip, while the communication circuitry 208 is on a separate chip. In another example embodiment, both the AFE 202 and the communication circuitry 208 are on one chip, and the processor 206 and the power management circuitry 204 are on another chip. It should be noted that other chip combinations are possible, including three or more chips, each bearing responsibility for the separate functions described, or sharing one or more functions for fail-safe redundancy.

In the case of FIG. 2B, each of the memories 203 and 205 of the two chips 212 and 214 respectively may include a ROM in which the majority of an application program is stored for the respective chip. In another embodiment, a single application program capable of running both chips may be stored in either or both ROM portions of both memories 203 or 205.

Performance of the data processing functions within the electronics of the sensor control device 102 (FIG. 1) provides the flexibility for the system 100 to schedule communications from the sensor control device 102 to the reader device 120, which in turn limits the number of unnecessary communications and can provide further power savings at the sensor control device 102.

FIG. 2C is a block diagram depicting another embodiment of a sensor control device 102. As with the embodiments described with respect to FIGS. 2A and 2B, an analyte sensor 104 (input), an antenna 211 (output), and a power source 210 are coupled with the sensor control electronics 110. Sensor control electronics 110 include the analog front end ("AFE") 202, the power management circuitry 204, the processor 206, and the communication circuitry 208. Here, the sensor control electronics 110 are shown with the memory divided into both volatile and non-volatile memory units (or portions). Specifically, the sensor control electronics 110 include ROM 230 (non-volatile), random access memory (RAM) 232 (volatile), and ferroelectric RAM (FRAM) 234 (non-volatile). Other types of non-volatile memory can also be used, including, but not limited to, flash memory, magnetoresistive RAM (MRAM), erasable programmable read-only memory (e.g., EPROM or EEPROM), a hard disk, an optical disc, and a holographic memory.

In this and all of the embodiments described herein, the various structural and functional elements (e.g., processor 256, AFE 252, communication circuitry 258, memory 253, ROM 230, RAM 232, FRAM 234, power management circuitry 254, sensor 104, serial interface 229) can be configured to communicate with every other element directly (e.g., via a dedicated pathway or bus), indirectly (e.g., via one or more common or shared buses), or any combination of the two.

In certain embodiments, part or all of the application software is stored within the ROM 230. Data structures within the ROM 230 that will be modified during use can be copied into the writable memory, e.g., the RAM 232 or the FRAM 234. As described herein, revisions to the application software or other software components can also be stored to the FRAM 234 during the board assembly or test phase (i.e., after fabrication and packaging of the semiconductor chips).

Also included with the sensor control electronics 110 is a serial interface 229. In certain embodiments, the serial interface 229 is for serial testing and can be configured as a boundary scan interface linked to a boundary scan architecture that permits access to the internal circuitry of the sensor control electronics 110 that may not otherwise be accessible after the sensor control electronics 110 are assembled into a semiconductor package, or onto a larger printed circuit board (PCB), and the like. The serial interface 229 can permit the writing of new software or programming to the sensor control electronics 110, such as replacement code for code stored within the ROM 230, as is described in further detail herein. By this means, the application program or programs can be revised.

In certain embodiments, the boundary scan architecture can be a Joint Test Action Group (JTAG) architecture, or other architecture conforming to IEEE 1149.1 (Standard Test Access Port and Boundary Scan Architecture), although the boundary scan architecture is not limited to such. In one embodiment where serial interface 229 is in a JTAG configuration (not shown), the serial interface 229 includes four externally accessible inputs and/or outputs (e.g., pins, pads, or connectors, and the like) that can be (or can be equivalent to) a Test Data In (TDI) input, a Test Data Out (TDO) output, a Test Clock (TCK) input, and a Test Mode Select (TMS) input. A Test Reset (TRST) can also optionally be included. The TDI can be used for inputting any data or software (not necessarily test related) into the device and the TDO can be used for outputting any data from the device. The TCK can be used as a clock and the TMS can be used to switch the architecture between various modes or state machine states. Together they can permit the serial advancement of data or software through a chain of internal registers (not shown) and into the internal circuitry and memory as needed.

The sensor control electronics 110 depicted in FIG. 2C can be implemented as one single semiconductor chip or as multiple chips located on one or more PCBs. If implemented as multiple chips, the functions provided by each of AFE 202, power management circuitry 204, processor 206, communication circuitry 208, ROM 230, RAM 232, and FRAM 234 can be implemented on separate chips or can be dispersed such that each resides on more than one chip, or any combination readily recognized to those of ordinary skill in the art.

As mentioned above, all or part of the programming or software for the sensor control device 102 and other devices can be hardcoded, or permanently coded, within the ROM 230. The software could be stored within another type of non-volatile memory as well. Regardless of the type of ROM or other non-volatile memory that is used, if the software is permanently coded, semi-permanently coded, or otherwise difficult or undesirable to revise, then the systems, devices, and methods described herein can provide an efficient, flexible, and/or cost-effective way to effectively revise that software.

Embodiments in which such permanent programming or software in a read-only memory is revised will now be described. The revision or replacement of software functions that are resident within the ROM of an integrated circuit, ASIC, or other device is discussed. In embodiments herein, the application program may be referred to as application programming or programming or application software or software, all of which are meant to indicate, e.g., primarily permanent programming that exists in a device and that includes numerous software functions. The term "function" is used broadly herein to encompass any program instruction, or sequence of instructions, that performs a specific task. In many embodiments, the function will be named and/or stored in a known location and the application software will be capable of calling that function by its name or location. Various computer languages refer to software functions using different terminology such as routines, subroutines, procedures, methods, programs, subprograms, or callable units, each of which are within the scope of the term "function" as used herein. Likewise, the systems, devices, and methods described herein are not limited to any particular programming language.

It should be understood, however, that the present subject matter can be likewise embodied in other technology, for example, including, but not limited to those in which the software functions are resident within another type of non-volatile memory other than ROM and the modification of aspects of software other than functions. In other words, those of ordinary skill in the art will readily recognize that the subject matter described and claimed herein can be used in many implementations other than that of a sensor control device having a ROM that is used in an in vivo analyte monitoring environment as described and shown herein.

Figure 7:
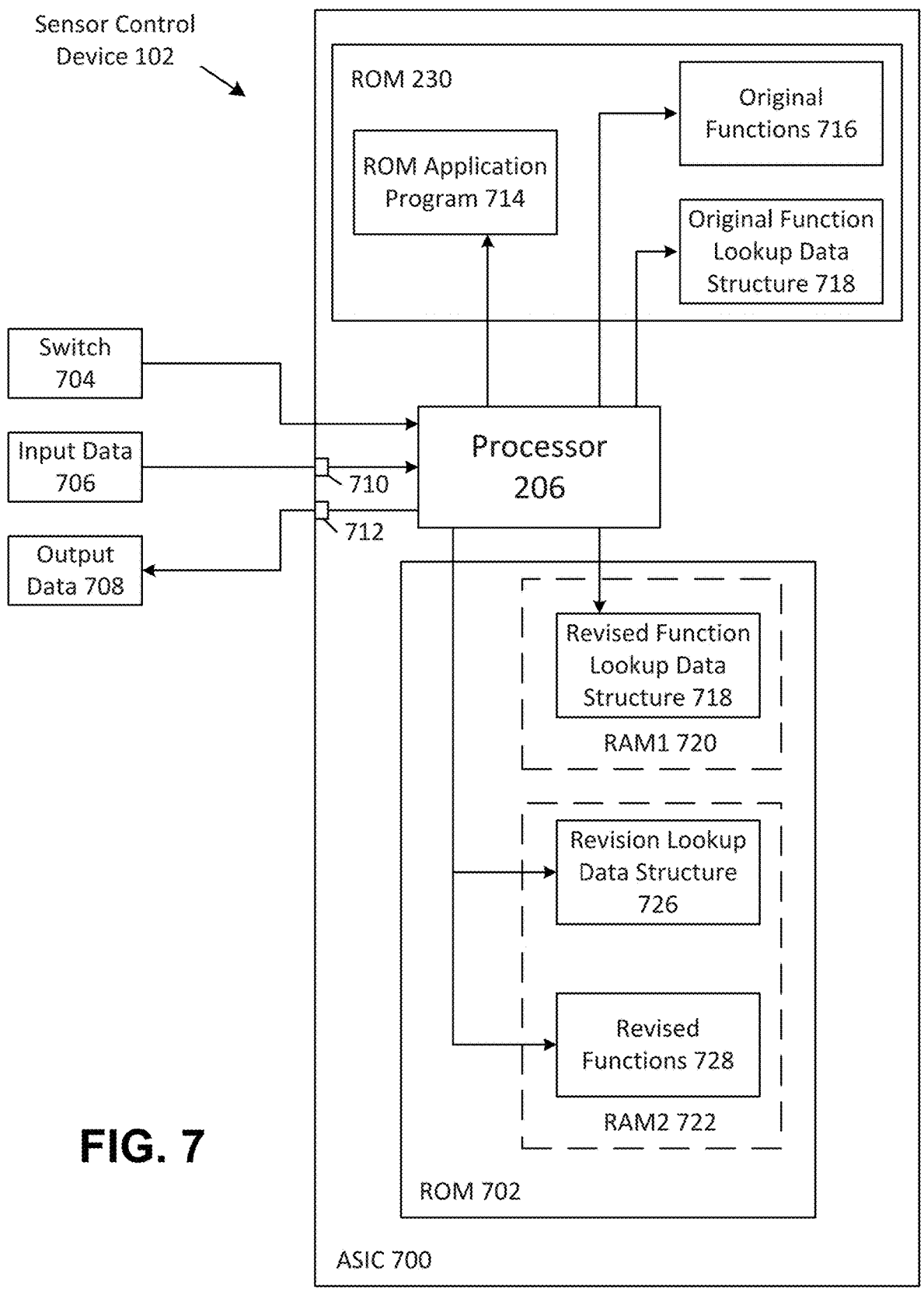
FIG. 7 presents a system view of an embodiment of an application-specific integrated circuit 700 (ASIC) in which an original function lookup data structure and original functions are located in a read-only memory and a revision lookup data structure and revised functions are located in a random access memory wherein the processor revises the functions used in the ROM application program with the revised functions, as applicable.

FIG. 7 presents a system view of an embodiment of an integrated circuit which in this case is an application-specific integrated circuit 700 (ASIC), and the revision of its programming. The ASIC 700 includes a processor 206, a ROM 230, and random access memory 702 (RAM). Outside the ASIC, but connected to it, is a switch 704 that activates the processor 206, input data 706 upon which the processor is to operate, and output data 708 produced by the processor for other uses. The input data is received at an input port 710 and the output data is transmitted at an output port 712.

Turning now to the ROM 230, an application program 714 is stored therein as well as original functions 716 that may be called and executed by the processor. Also stored in the ROM is an original function lookup data structure 718 that provides an identifier and an address for each of the original functions in the ROM that may be called and executed by the processor 206 when programmed with the application program 714. The application program calls functions by function identifier in this embodiment.

Upon receiving an activation signal from the switch 704, the processor 206 automatically accesses the ROM 230 and copies the original function lookup data structure 718 to the RAM 702. In this case, and for illustrative purposes only to more clearly show an embodiment, the RAM 702 is shown as having two portions, the RAM1 portion 720 and the RAM2 portion 722. In this embodiment, the processor copies the original function lookup data structure 718 from the ROM to the RAM1 720. For purposes of clarity only, the lookup data structure in the ROM 230 is labeled as the "original function lookup data structure." The lookup data structure copied to the RAM1 is labeled as the "revised function lookup data structure" and is indicated in the drawing by numeral 724.

In this ASIC 700, the basic input/output system or "BIOS" of the processor has been programmed to instruct the processor to automatically copy the original function lookup data structure 718 to the RAM1 720 upon activation. Similarly, the processor BIOS causes the processor to search the RAM2 722 for a revision lookup data structure 726. If one is not found, the processor BIOS programs the processor 206 to access the ROM 230 and run the application program 714. In response to a call made by the running application program for a function, usually by calling an identifier of that function, the processor will access the revised function lookup data structure 724 in RAM1 720 to locate the called identifier of that function, read the address of that function 716 among the functions stored in the ROM 230 and will execute that function as stored in the ROM 230.

However, a revision lookup data structure 726 can be stored in the RAM2 722. A revision lookup data structure may be stored during production of the ASIC 700, or it may be stored at a later time, and if one is store, its accompanying revised function 728 are also stored in RAM2 in this embodiment. For example, a revision lookup data structure 726 and revised functions 728 may be uploaded to the ASIC through the input port 710 at a time where the original functions are revised. In such a case, the processor 206 is programmed to receive the revision lookup data structure at the input port 710 and store it in the RAM2 726. If a revision lookup data structure already exists in the RAM2, it may be overwritten by the new revision lookup data structure, or may be deactivated and the new revision lookup data structure stored elsewhere in the RAM2, or other action may be taken to use the new revision lookup data structure, as is determined for the particular ASIC and the revisions uploaded.

In the event that the processor 206 locates a revision lookup data structure 726 in the RAM2 722, the processor would compare the function identifiers and addresses of the revision lookup data structure with those identifiers and addresses in the revised function lookup data structure 724 that was copied from the original function data structure 718 in the ROM 230. In the event that the revision lookup data structure includes a different address for at least one function than what is in the revised function lookup data structure, the processor will update the address for that identifier in the revised function lookup data structure to that revised address. In the embodiment of FIG. 7, that revised address would be a memory address of the RAM2 722 where the revised functions 728 are stored, rather than the original functions 716 stored in the ROM. In other embodiments, the revised functions can be stored elsewhere for access by the processor 206.

After the revised function lookup data structure 724 has been revised in the case where a revision lookup data structure 726 exists, or is the same as the original function lookup data structure 718 in the case where no revisions exist, the processor 206 now accesses the ROM 230, loads the application program 714, and is thereby programmed to receive input data 706, process that input data in accordance with the running application program 714, and provide data output 708 through the output port 712. As is shown, the processor 206, the ROM 230, and the RAM 702 all exist on the same ASIC 700. Thus, that ASIC has effectively been reprogrammed through the use of only the RAM 702 on the ASIC itself. This results in a very rapid and lower cost system and allows the ASIC programming to be easily revised. No complex programmable logic arrays or other arrays of logic elements are necessary. The revised programming and the revision lookup data structure need only be uploaded to the RAM2 722 of the ASIC 700.

Figure 3:
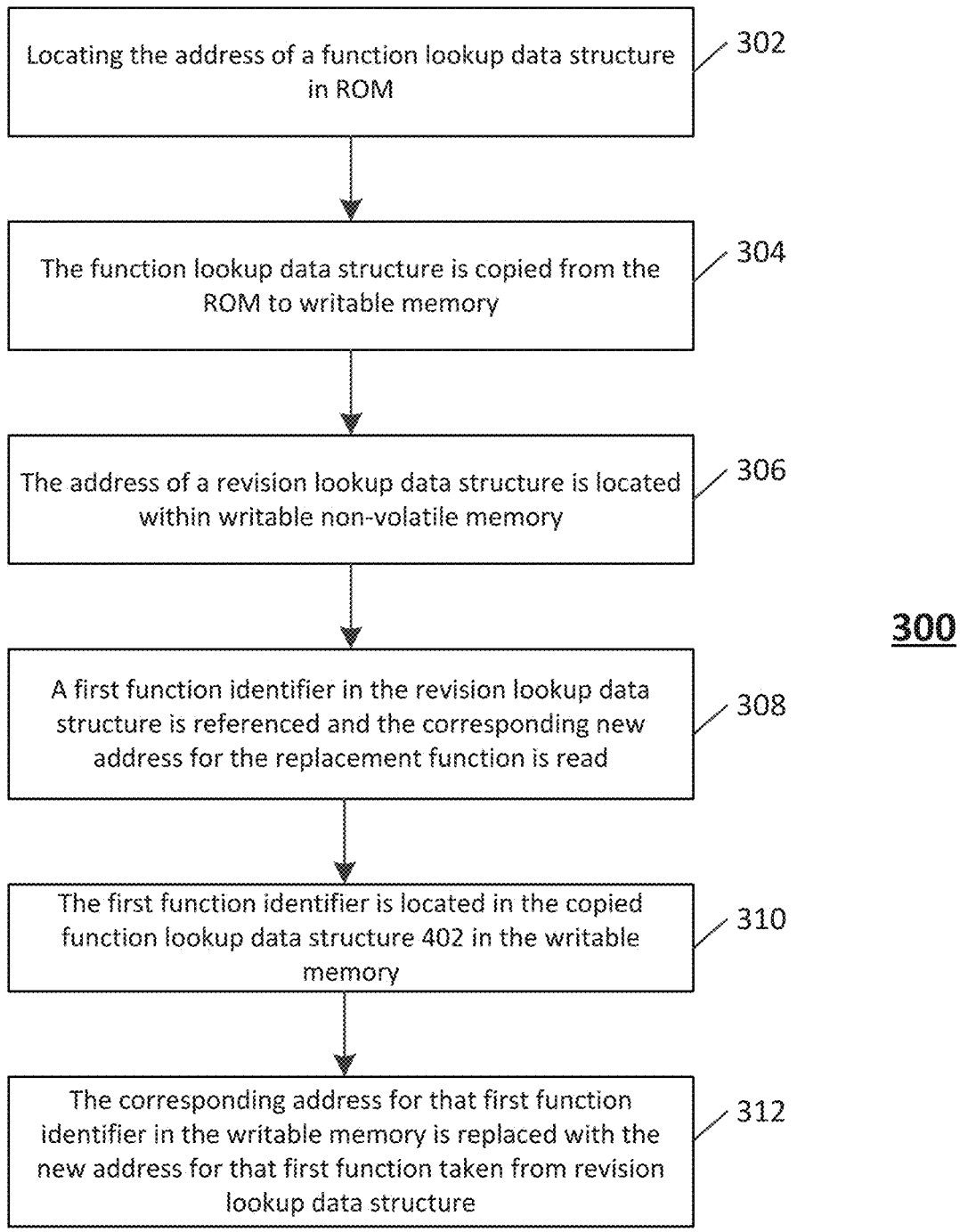
FIG. 3 is a flow diagram depicting an example embodiment of a method of revising software stored in the ROM of a sensor control device, such as that shown in FIG. 2C.

FIG. 3 is a flow diagram depicting an example embodiment of a system and method 300 of revising software in a device having permanent application programming. In this case, the embodiment includes the analyte monitoring environment. In many embodiments, the method 300 described below can be coded in software, either generally or as one or more software functions, and can be executed by a processor, such as the processor 206 (and its variants) described with respect to FIGS. 2A, 2B, and 2C. In some embodiments, the method 300 can be performed by a software revision function (which can also be referred to as a patch function for patching the ROM code). The method 300 begins with 302, where the address of a function lookup data structure 402 (FIG. 4A) is located in the ROM (e.g., the ROM 230 described with respect to FIG. 2C). At 304, the function lookup data structure 402 is copied from the ROM to a writable memory device (e.g., to RAM 232 or FRAM 234 as described with respect to FIG. 2C).

An example embodiment of a function lookup data structure 402 is depicted in FIG. 4A. The function lookup data structure 402 can include a compilation of some or all of the software functions that can be called by the permanent application software. In this embodiment, the function lookup data structure 402 includes an identifier 410 for each software function stored within the ROM 230, as well as the corresponding address 412, or pointer, for that software function in the ROM. The identifier can be any string of characters that is known to identify the software function, e.g., an index, or a name. Here, the function lookup data structure 402 includes N identifiers and the corresponding addresses.

Referring back now to FIG. 3, at 306, the address of a revision lookup data structure 404 is located within the writable non-volatile memory (e.g., the FRAM 234). An example embodiment of revision lookup data structure 404 is depicted in FIG. 4B. The revision lookup data structure 404 can include a compilation of an identifier 410 and an address 414 (or pointer) for one or more software functions that are intended to replace corresponding functions set forth in the function lookup data structure 402 and stored in the ROM 230. In this embodiment, the revision lookup data structure 404 includes the identifier for each software function to be replaced (e.g., using only those same identifiers set forth in the function lookup data structure 402) and the corresponding new address for that replacement function within the writable non-volatile memory (e.g., the FRAM 234). In many instances (but not all), only a subset of the software functions set forth in the function lookup data structure 402 will be replaced by software functions set forth in the revision lookup data structure 404. For instance, in one implementation there may be one-hundred software functions set forth in the function lookup data structure 402, and only a handful of those are replaced by functions set forth in the revision lookup data structure 404 (e.g., functions 24, 46, and 72 in the embodiment of FIG. 4B).

The term "data structure" is used herein, such as with respect to the function and revision lookup data structures, to broadly refer to any organization of data in software or in hardware that enables the organized data to be referenced by the application software. Examples of data structures include, but are not limited to, an array, a set, a tree, a software table, a software list, a record, a database, an object, a union, a hardware lookup table, or hardware lookup list. The function lookup data structure 402 and the revision lookup data structure 404 can also be implemented as a sequence of software instructions (e.g., as a software function). It should be noted that, for ease of illustration, the data structures 402 and 404 are depicted as human readable tables in FIGS. 4A and 4B. Those of ordinary skill in the art will readily recognize that these data structures 402 and 404 would be implemented in machine-readable formats in many actual implementations.

Again referring back to FIG. 3, at 308, a first function identifier 410 in the revision lookup data structure 404 is referenced and the corresponding new address 414 for the replacement function is read. At 310, the first function identifier is located in the copied function lookup data structure 402 in the writable memory and, at 312, the corresponding address for that first function identifier in the writable memory is replaced with the new address for that first function taken from revision lookup data structure 404. An example of a revised function lookup data structure 406 is shown in FIG. 4C, where Address_024, Address_046, and Address_072 in the function lookup data structure 402 (FIG. 4A) have been replaced with New_Address_024, New_Address_046, and New_Address_072 taken from the example of the revision lookup data structure 404 depicted in FIG. 4B. Thus, the revised function lookup data structure 406 of FIG. 4C includes the same function identifiers 410 as FIGS. 4A and 4B but has revised the function address to replace the function address with the replacement function address of FIG. 4B. This new structure is the revised function lookup data structure 724 of FIG. 7.

In many embodiments, method 300 and the other methods described herein are performed during the initialization or startup of the sensor control device 102 (e.g., after being activated or powered on). This is so that any revisions to software functions 716 stored in the ROM 230 are immediately identified and implemented. After completion of the initialization or startup routine, the sensor control device 102 can enter a normal operation or post-initialization mode where it can begin to collect analyte data, process the data, and/or transfer it to another device for display or further analysis, as described above. While in the normal operation mode, each time a function is called in the application software 714, the system will refer to the now-revised version of the function lookup data structure 406 (e.g., see FIG. 4C and 724 in FIG. 7) to identify the address for the called function in the memory. The address for the called function, if that function was not revised, may reside within the ROM and the processor will execute that ROM non-revised version of the function 716. Alternatively, the address for the called function, if that function was revised, may reside within the writable non-volatile memory (e.g., FRAM 234) and the processor will execute the FRAM version of the function 728. It should be noted that the headers for the columns of the various data structures (e.g., Function Identifiers, Function Addresses, etc.) are shown in FIGS. 4A, 4B, and 4C for ease of illustration only, and can be omitted if desired.

As described above in relation to FIG. 7, the initialization process of the device in which the ASIC 700 is used, includes revising any program or software functions if such exist. This can be done as a priority program of the ASIC. The example of a ROM BIOS was given but other ways of engaging the initialization routine may be used.

Figure 5A:
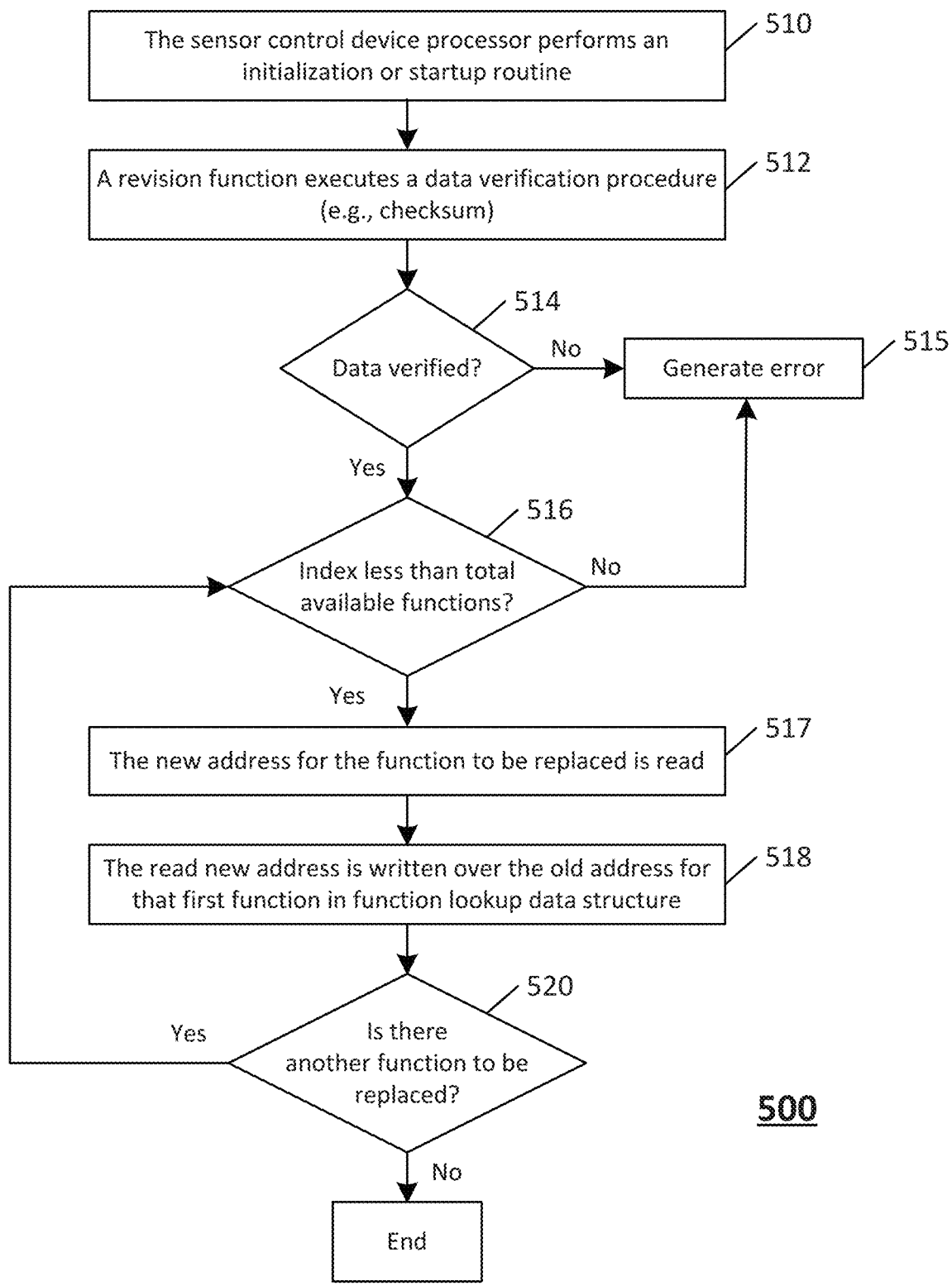
FIG. 5A is a flow diagram depicting another example embodiment of a method of revising software stored in the ROM of a sensor control device in which a verification procedure is used to assure accuracy.
Figure 5B:
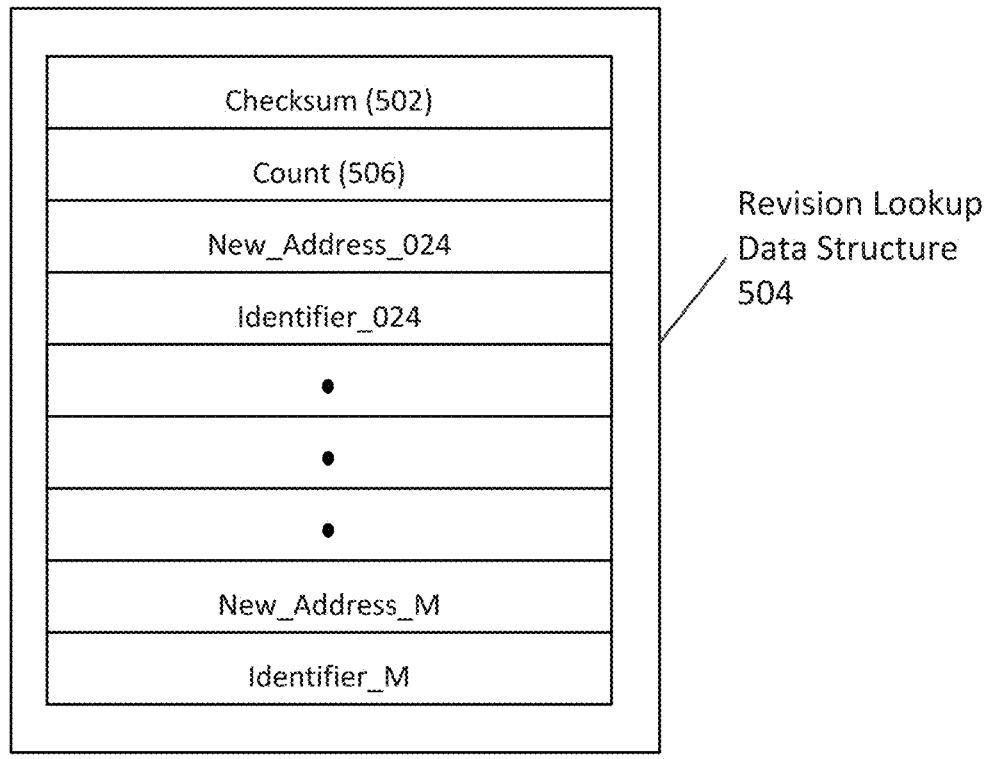
FIG. 5B is a block diagram depicting another example embodiment of a revision lookup data structure in human readable form.

Another example embodiment of a system and method of revising software, in particular a program located on read-only memory such as in an ASIC, is depicted in FIG. 5A. Here, the method 500 is similar to the previous method 300 but includes steps to verify the integrity of the data in another embodiment of the revision lookup data structure 404 (FIG. B) depicted in FIG. 5B. A checksum 502 is calculated for the compiled and memory-linked revision lookup data structure 404, and this checksum 502 is stored in the memory during the assembly or test process. The sensor control device 102 is then shipped to the user and, in certain embodiments, when that user activates the sensor control device 102, the resident processor performs an initialization or startup routine at 510.

As part of the initialization or startup routine, a number of software functions are executed, including a revision function (or patch function). At 512, the revision function executes a data verification procedure. In some embodiments, this can include making reference to the revision lookup data structure 504 of FIG. 5B and reading a count 506 of the number of functions to be replaced or patched. The revision function can have at its disposal a value representing the amount of memory space that is allocated to the identifier and address of a single replacement function in the revision lookup data structure 504. The revision function can utilize this value with count 506 to calculate the total memory space allocated to revision lookup data structure 504 (or a portion thereof). This calculated checksum value can then be compared to the stored checksum value 502 to determine if they match. If there is a match, the data can be treated as verified. If there is not a match, then the system can interpret this as a data error and report it to the application software and/or the user, and potentially enter a termination state.

A determination as to whether the data is verified is depicted as decision 514. If the data is verified, then the processor can begin replacing functions and, if not, then an error can be generated at 515. In this embodiment, the identifiers are configured as sequential indices. At 516, it is determined if the index for the first (or next) function to be replaced in the revision lookup data structure 504 is less than the number of replaceable functions in the function lookup data structure 402 to the writable memory. If not, then the system generates an error at 515. If the index is less, then at 517 the new address for the function to be replaced is read and, at 518, that new address is written over the old address for that first function in the function lookup data structure 402. At 520, it is determined if there is another function to be replaced and, if so, steps 514, 516, and 518 are repeated for that next function. The process continues until all functions have been replaced or an error is generated.

Figure 6A:
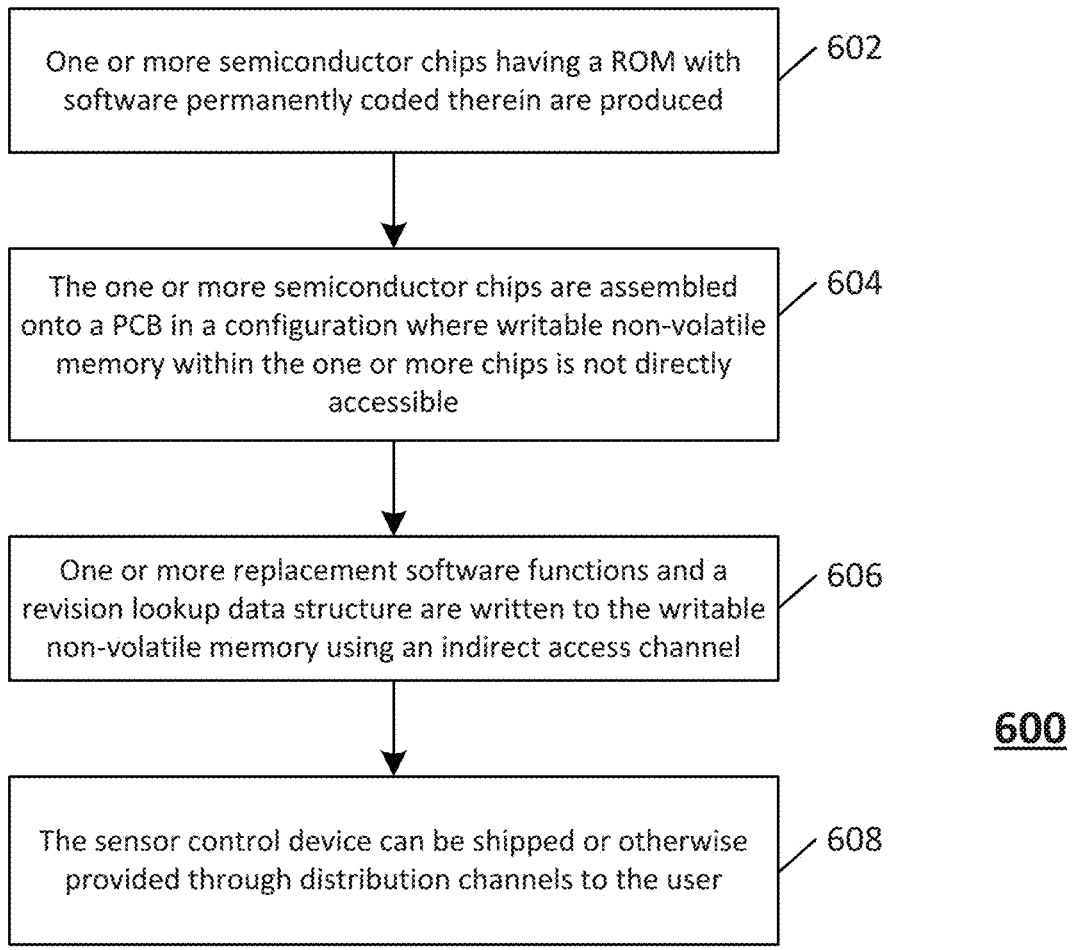
FIG. 6A is a flow diagram depicting an example embodiment of a method of producing a sensor control device having software stored in ROM and revised software stored in writable non-volatile memory.

Also provided herein are methods of manufacturing a sensor control device 102, that can take the form of an ASIC. FIG. 6A is a flow diagram depicting an example embodiment of one such method 600. At 602, one or more semiconductor chips having a ROM with software hardcoded therein are produced. At 604, the one or more semiconductor chips are assembled onto a PCB in a configuration where writable non-volatile memory resident within the one or more chips is not directly accessible, i.e., the memory bus and control signal leads are not present at an externally accessible interface. Then, at 606, one or more replacement software functions and a revision lookup data structure are written to the writable non-volatile memory using an indirect access channel.

In one example embodiment, the indirect access channel is a serial interface 229 (e.g., a boundary scan interface, FIG. 2C) that provides access to the memory bus and control signals for the writable non-volatile memory. In this embodiment, the replacement software functions and revision lookup data structure are serially loaded into the serial interface and iteratively loaded into the memory so that they are available to be used by the application software after execution of a revision procedure, such as those described with respect to method 300 and method 500 herein.

In another example embodiment, the indirect access channel is an RF interface through the communication circuitry 208 (FIG. 2C). Here, the replacement software functions and the revision lookup data structure are transmitted over an RF wavelength to the communication circuitry 208, which receives them and routes them to the processor 206, or in other programming unit, which can then write the received software and the data structure to the writable non-volatile memory.

Figure 6B:
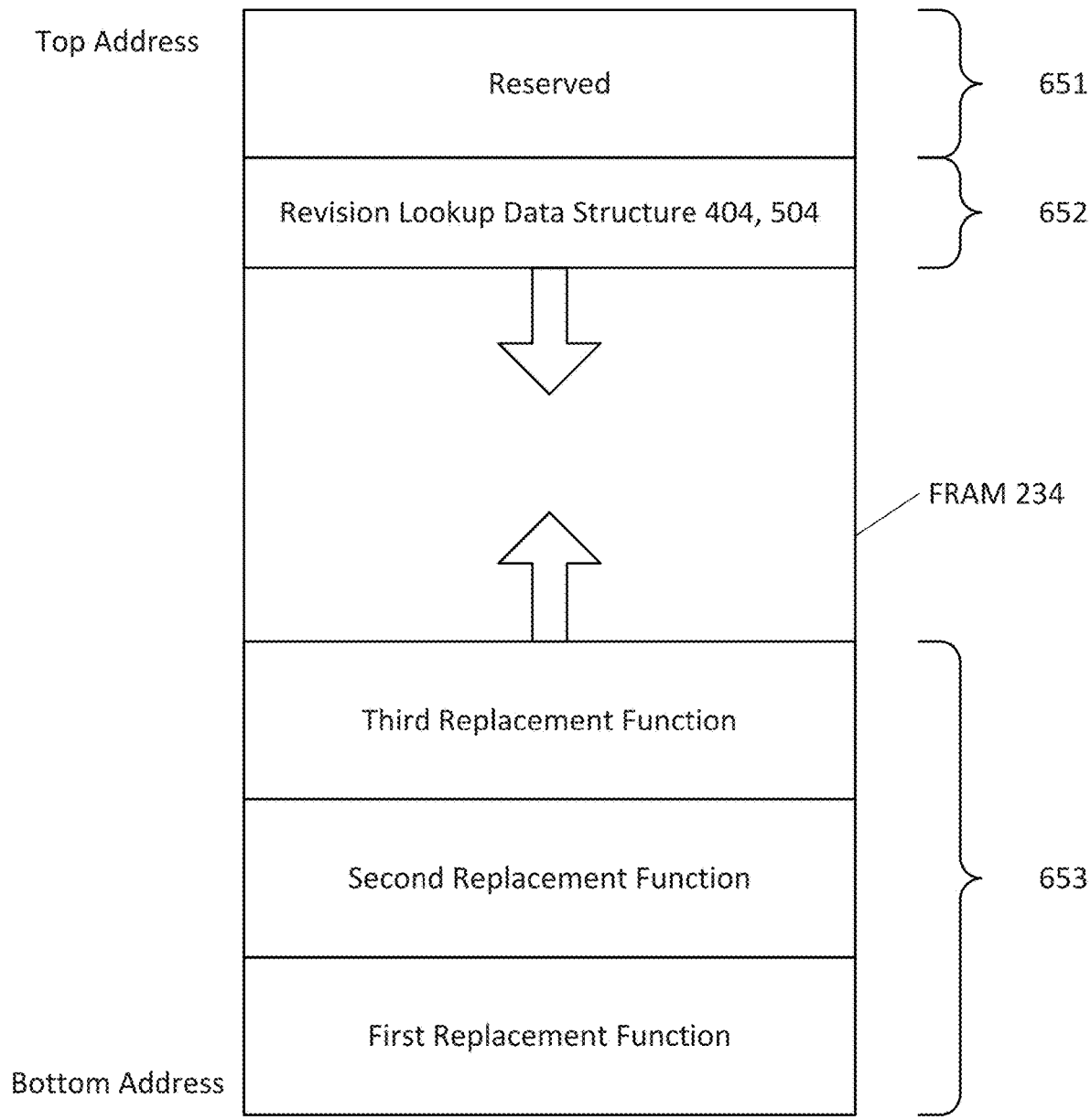
FIG. 6B is a block diagram conceptually depicting the allocation of various memory spaces within a writable non-volatile memory.

In many implementations, the sensor control device 102 of the embodiment discussed is designed to have as small a profile as possible so as not to draw notice to its presence on the user's skin and to minimize costs and power usage. Smaller size, lower cost, and lower power requirements are reasons why ASICs are used in many devices. As such, memory space can be strictly allocated. FIG. 6B depicts an example embodiment of the FRAM 234 that conceptually illustrates a method of storing data thereon. Here, a first portion 651 of the FRAM 234 is reserved for the storage of data, parameters, and the like that are used by the application software in the performance of the analyte monitoring functions. One example of this data can be calibrated parameters that are individually determined for each sensor control device 102 during the assembly and test processes. This first portion 651 is located at the top, or beginning at the first address, of the FRAM 234 in this embodiment.

A second portion 652 of the FRAM 234, which can be located directly following the first portion 651, contains the revision lookup data structure 404 or 504. A third portion 653 of the FRAM 234 begins at the bottom, or last address, of the FRAM 234 and proceeds in a reverse fashion. This third portion 653 can contain the replacement software functions. The revision lookup data structure 404 or 504 can alternatively be stored in the third portion 653 with the replacement software functions being instead stored in the second portion 652. Memory layouts can vary between implementations and the second portion 652 need not begin immediately after a first portion 651 and the third portion 653 need not begin at the absolute bottom of the memory as shown here. As new replacement functions are generated, the corresponding entries in the revision lookup data structure 404 are added to the second portion 652, which grows downward as shown here. Likewise, the software replacement functions themselves are stored in the third portion 653, which grows in an upward fashion. During compilation and linking of the compiled code to memory locations, conflicts in the usage of the FRAM can be identified, and resolved, if possible.

Referring back to FIG. 6A, upon completion of the storage of the replacement software functions and the data structure, and any remaining assembly and/or testing, then at 608, the sensor control device 102 can be shipped or otherwise provided through distribution channels to the user.

For many of the embodiments described herein, the function lookup data structure is stored within the ROM and later revised (in the RAM) by the revision lookup data structure stored in the FRAM. In alternative embodiments, the function lookup data structure can instead be stored in the writable non-volatile memory (e.g., the FRAM) alongside the replacement software functions. In these alternative embodiments, a revision lookup data structure is not required as the most current version of the function lookup data structure is loaded into the writable non-volatile memory during the assembly or post-assembly manufacturing procedures. Thus, the need to revise the function lookup data structure is also obviated, and instead the application software and processor can proceed directly to referencing the function lookup data structure after every qualifying function call.

All embodiments described herein can be used and claimed with respect to different fields of use both within and outside of the healthcare industry. Regarding one aspect of the healthcare industry, these embodiments can be claimed as used in all variations of in vivo, in vitro, and ex vivo analyte monitoring systems described herein.

The embodiments described with respect to FIGS. 6A and 6B are equally applicable to these alternative embodiments, and one of ordinary skill in the art will readily recognize that reference to the revision lookup data structure with respect to FIGS. 6A and 6B can be replaced with reference to the function lookup data structure. The storage of the function lookup data structure directly within the writable non-volatile memory may not be desired in instances where the memory capacity of the device is strictly allocated, as the function lookup data structure can be comprehensive of all or most software functions performed by the device, and can be significantly larger than the revision lookup data structure.

The embodiments described herein, and the claims thereto, are directed to patent eligible subject matter. They do not constitute abstract ideas for a myriad of reasons. One such reason is that any claim that provides for the ability to dynamically update permanent or semi-permanent programming allows the performance of the computing device to be improved, errors to be corrected, or other deficiencies rectified, which thus constitutes an improvement to the functioning of the computer itself and thus qualifies as "significantly more" than an abstract idea.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

As used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present subject matter is not entitled to antedate such publication by virtue of prior disclosure. Further, the dates of publication provided may be different from the actual publication dates which may need to be independently confirmed.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the scope of the claims by features, functions, steps, or elements that are not within that scope.

What is claimed is:

1. A method of producing an analyte monitoring device, wherein the analyte monitoring device comprises a processor adapted to execute application software, a non-volatile writable memory, and a read-only memory (ROM) having a function lookup data structure and a first function stored thereon, wherein the function lookup data structure comprises an identifier for the first function and a first address of where the first function is stored, the method comprising:

inputting a replacement function for the first function into the writable memory; and inputting a revision lookup data structure into the writable memory, wherein the revision lookup data structure includes an identifier for the first function and a second address of where the replacement function for the first function is stored.

2. The method of claim 1, wherein the analyte monitoring device comprises a serial interface, wherein the replacement function and the revision lookup data structure are input into the writable memory through the serial interface.

3. The method of claim 2, wherein the analyte monitoring device comprises a boundary scan architecture, and the serial interface provides access to the boundary scan architecture.

4. The method of claim 1, wherein the analyte monitoring device comprises a radio frequency (RF) receiver, wherein the replacement function and the revision lookup data structure are input into the writable memory using the RF receiver.

5. The method of claim 1, wherein the writable memory has a memory input/output (I/O) bus that provides read and write access to the memory, and wherein the memory I/O bus is not directly externally accessible.

6. The method of claim 1, wherein the analyte monitoring device further comprises volatile and writable memory.

7. The method of claim 6, wherein the processor is programmable to store a function lookup data structure on the volatile and writable memory.

8. The method of claim 1, wherein the analyte monitoring device is a sensor control device adapted for use in an in vivo analyte monitoring system.

9. The method of claim 8, wherein the revision lookup data structure includes a first plurality of identifiers and a first plurality of addresses, each identifier within the first plurality of identifiers corresponding to a different one of the first plurality of addresses.

10. The method of claim 9, wherein each identifier of the first plurality of identifiers and each corresponding address of the first plurality of addresses are specific to a different function of a first plurality of functions.

11. The method of claim 10, wherein the function lookup data structure includes a second plurality of identifiers and a second plurality of addresses, each identifier within the second plurality of identifiers corresponding to a different one of the second plurality of addresses.

12. The method of claim 11, wherein each identifier of the second plurality of identifiers and each corresponding address of the second plurality of addresses are specific to a different function of a second plurality of functions, and wherein each identifier of the first plurality of identifiers is the same as an identifier of the second plurality of identifiers.

13. The method of claim 1, wherein the identifier for the first function in the revision lookup data structure is identical to the identifier for the first function in the function lookup data structure.

14. The method of claim 1, wherein the identifier for the first function in the function lookup data structure is an index value.

15. The method of claim 1, wherein the function lookup data structure is an array or a software table.

16. The method of claim 1, wherein the revision lookup data structure is an array or a software table.

17. The method of claim 1, wherein the processor is a microprocessor or controller.

* * * * *